US010997397B2

(12) United States Patent
Wang et al.

(10) Patent No.: US 10,997,397 B2
(45) Date of Patent: May 4, 2021

(54) PATIENT IDENTIFICATION SYSTEMS AND METHODS

(71) Applicant: KONINKLIJKE PHILIPS N.V., Eindhoven (NL)

(72) Inventors: Haibo Wang, Melrose, MA (US); Cornelis Conradus Adrianus Maria Van Zon, Cambridge, MA (US); William Palmer Lord, Fishkill, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 60 days.

(21) Appl. No.: 16/463,484

(22) PCT Filed: Nov. 22, 2017

(86) PCT No.: PCT/EP2017/079988
§ 371 (c)(1),
(2) Date: May 23, 2019

(87) PCT Pub. No.: WO2018/099773
PCT Pub. Date: Jun. 7, 2018

(65) Prior Publication Data
US 2019/0362137 A1 Nov. 28, 2019

Related U.S. Application Data

(60) Provisional application No. 62/517,306, filed on Jun. 9, 2017, provisional application No. 62/427,833, filed on Nov. 30, 2016.

(51) Int. Cl.
G06K 9/00 (2006.01)
G06N 20/00 (2019.01)
G06K 9/62 (2006.01)

(52) U.S. Cl.
CPC ...... *G06K 9/00288* (2013.01); *G06K 9/00255* (2013.01); *G06K 9/00926* (2013.01); *G06K 9/6262* (2013.01); *G06N 20/00* (2019.01)

(58) Field of Classification Search
CPC .................. G06K 9/00288; G06K 9/00255
See application file for complete search history.

(56) References Cited

U.S. PATENT DOCUMENTS 9,125,606 B2 9/2015 Verkruijsse et al.
2006/0140455 A1 6/2006 Costache et al.
(Continued)

FOREIGN PATENT DOCUMENTS

CN 106372566 A 2/2017
KR 2013118512 A 10/2013
WO 2017004602 A1 1/2017

OTHER PUBLICATIONS

International Search Report and Written Opinion, International Application No. PCT/EP2017/079988, dated May 4, 2018.
(Continued)

Primary Examiner — Tuan H Nguyen

(57) ABSTRACT

Disclosed techniques relate to identifying subjects in digital images. In some embodiments, intake digital images (404) are acquired (1002) that capture a first subject. A subset of the intake digital images is selected (1004) that depict multiple different views of the first subject's face. Based on the selected subset of intake digital images, first subject reference templates are generated and stored in a subject database (412). Later, a second subject is selected (1008) for identification within an area. Associated second subject reference templates are retrieved (1010) from the subject reference database. Digital image(s) (420) that depict the area are acquired (1012). Portion(s) of the digital image(s) that depict faces of subject(s) in the area are detected (1014) as detected face image(s). A given detected face image is
(Continued)

compared (1016) to the second subject reference templates to identify the second subject (1018) in the digital image(s) that capture the area.

15 Claims, 11 Drawing Sheets

(56) References Cited

U.S. PATENT DOCUMENTS

| | | |
|---|---|---|
| 2011/0081052 A1 | 4/2011 | Bigioi et al. |
| 2014/0139656 A1 | 5/2014 | Jeanne et al. |
| 2014/0148663 A1 | 5/2014 | Bresch et al. |
| 2014/0192177 A1 | 7/2014 | Bartula et al. |
| 2014/0235976 A1 | 8/2014 | Bresch et al. |
| 2014/0253709 A1* | 9/2014 | Bresch ................. A61B 5/1127 348/77 |
| 2015/0206030 A1 | 7/2015 | Sultana et al. |
| 2017/0333666 A1* | 11/2017 | Goldberg ............... A61B 5/486 |

OTHER PUBLICATIONS

Tan, X. et al., "Face Recognition Under Occlusions and Variant Expressions with Partial Similarity", IEEE Transactions on Information Forensics and Security, vol. 4, No. 2, Jun. 2009.

* cited by examiner

PATIENT IDENTIFICATION SYSTEMS AND METHODS

CROSS-REFERENCE TO PRIOR APPLICATIONS

This application is the U.S. National Phase application under 35 U.S.C. § 371 of International Application No. PCT/EP2017/079988, filed on 22 Nov. 2017, which claims the benefit of U.S. Provisional Patent Applications 62/517,306, filed on 9 Jun. 2017 and 62/427,833, filed 30 Nov. 2016. These applications are hereby incorporated by reference herein.

TECHNICAL FIELD

The present disclosure is directed generally, but not exclusively, to identifying people in digital images (including streams of digital images). More particularly, but not exclusively, various methods and apparatus disclosed herein relate to identifying people in digital images (or streams thereof) so that those people can be located in areas such as waiting rooms of a hospital.

BACKGROUND

There are a number of scenarios in which it may be desirable to automatically identify people (or "subjects") based on digital images that capture scenes containing people. For example, when patients visit a hospital, they typically are registered, triaged, and then sent to an area such as a waiting room to wait for hospital resources such as physicians to become available to examine and/or treat the patients. Being able to automatically identify individual patients may be helpful for continuing to monitor their conditions (e.g., for deterioration) while they wait for allocation of medical resources. It may also be helpful for determining if/when patients left without being seen (LWBS). Automatically identifying people based on digital images may also be useful in a variety of other contexts, such as airports, train stations, border crossings, gyms and fitness centers, various businesses, etc.

In some contexts, it may be desired to identify individual subjects in digital images that contain multiple subjects. For example, digital images captured by a camera in a waiting room are likely to depict, in addition to waiting patients, other people such as friends, relatives, etc. that might be waiting with the patients. Face detection techniques may detect all the faces in the digital images, but it may not be clear which faces belong to patients and which belong to others. Moreover, subjects in monitored areas such as waiting rooms are not likely going to be looking at the camera. Instead they may be looking at their phones, magazines, each other, etc. Thus, even when depicted faces are detected, the detected faces as depicted in their raw state may not be ideal for identifying subjects. In addition, the light conditions in the area may vary across time (e.g., daytime versus nighttime) and/or across the physical space.

SUMMARY

The present disclosure is directed to methods, systems, and apparatus for automatically identifying people depicted in acquired digital images. As one non-limiting example, a plurality of triaged patients may wait in a waiting room until they can be seen by an emergency medicine physician. The patients may be included in a patient monitoring queue (also referred to simply as a "patient queue") that is ordered or ranked, for instance, based on a measure of acuity associated with each patient (referred to herein as a "patient acuity measure") that is determined based on information obtained/acquired from the patient by a triage nurse, as well as other data points such as patient waiting time, patient presence, etc. One or more "vital sign acquisition cameras" mounted in the waiting room may be configured to periodically perform contactless and/or unobtrusive acquisition of one or more updated vital signs and/or physiological parameters from each patient. These updated vital signs and/or physiological parameters may include but are not limited to temperature, pulse rate, oxygen saturation ("$SpO_2$"), respiration rate, posture, perspiration and so forth.

In order to identify a particular patient from which the vital sign acquisition camera(s) should acquire updated vital signs, techniques described herein may be employed to match so-called "subject reference templates"—e.g., digital images that depict a variety of different views of a subject's face—to a person contained in a scene captured in one or more digital images acquired by one or more vital sign acquisition cameras, e.g., from a relatively wide field of view ("FOV"). More generally, techniques described herein may be implemented in various contexts to identify subjects depicted in digital images (e.g., single images and/or streams of digital images, such as video feeds), e.g., by collecting subject reference templates associated with each subject to be monitored and later using those subject reference templates to identify the subject in subsequently captured digital images.

Generally, in one aspect, a method may include: acquiring a plurality of intake digital images that capture at least a first subject; selecting, from the plurality of intake digital images, a subset of intake digital images that depict multiple different views of a face of the first subject; generating, based on the selected subset of intake digital images, first subject reference templates, wherein the first subject reference templates are stored in a subject database in association with information related to the first subject, and the subject database stores subject reference templates related to a plurality of subjects; selecting a second subject to identify within an area; retrieving second subject reference templates related to the second subject from the subject reference database; acquiring one or more digital images that depict the area; detecting, as one or more detected face images, one or more portions of the one or more digital images that depict faces of one or more subjects in the area; comparing a given detected face image of the detected one or more detected face images to the second subject reference templates; and identifying, based on the comparing, the second subject in the one or more digital images that capture the area.

In various embodiments, the area may include a waiting room, the intake images may be acquired using a first camera that is configured to capture a registration or triage area, and the digital images that depict the area may be acquired using a second camera that is configured to capture the waiting room. In various embodiments, the comparing may include applying the given detected face image as input across a trained machine learning model to generate output that indicates a measure of similarity between the given detected face image and the second subject, wherein the machine learning model is trained based at least in part on the second subject reference templates. In various embodiments, the trained machine learning model may take the form of a linear discriminant analysis model. In various embodiments, the method may further include retraining the machine learning model in response to a new subject being added to the subject database or an existing subject being removed from the subject database. In various embodiments, the trained machine learning model may be trained based on the subject reference templates related to the plurality of subjects.

In various embodiments, one or more of the subset of intake digital images may be selected based on being sufficiently dissimilar to one or more other intake digital images. In various embodiments, the method may further include normalizing the one or more face images so that each detected face image depicts a frontal view of a face. In various embodiments, the normalizing may include geometric warping.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure.

DETAILED DESCRIPTION

Figure 1:
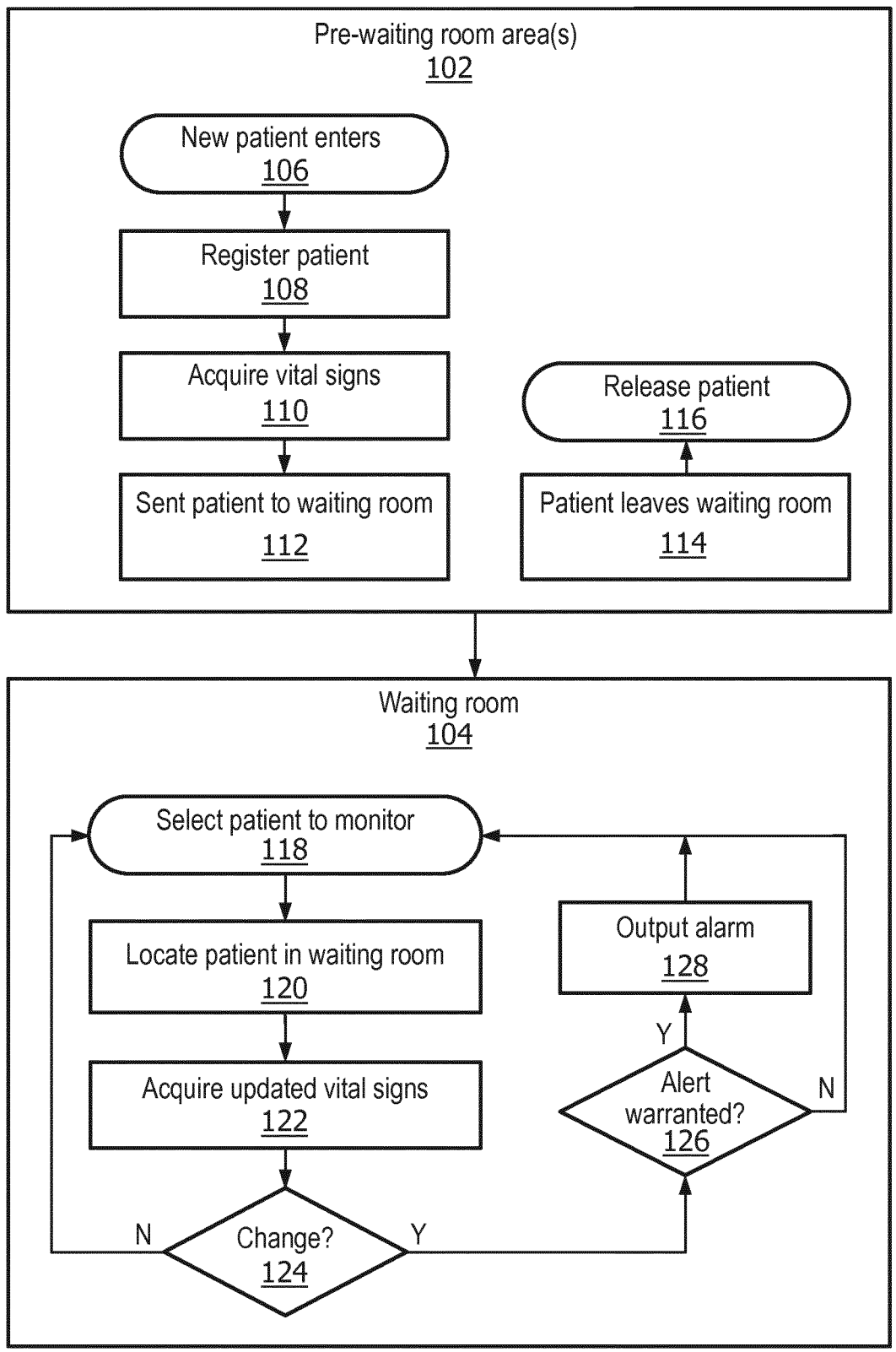
FIG. 1 schematically illustrates a general process flow for monitoring patients identified in digital images using disclosed techniques, in accordance with various embodiments.

FIG. 1 schematically illustrates generally how patients may be monitored using disclosed techniques. In particular, operations and actions are depicted that may occur in a pre-waiting room area, such as at a pre-waiting room area(s) 102, which may include reception and/or registration, and/or a triage station or booth. In addition, operations and actions are depicted that may occur in a waiting room 104. It should be understood that the sequence of FIG. 1 is not meant to be limiting, and other sequences are possible.

At block 106, a new patient may enter and/or approach pre-waiting room area(s) 102, e.g., after checking in at a reception desk (not depicted). At block 108, the new patient may be registered. Registration may include, for instance, collecting information about the patient such as the patient's name, age, gender, insurance information, and reason for visit. Typically, but not exclusively, this information may be manually input into a computer by medical personnel such as receptionist or registrar. In some embodiments, one or more reference digital images of the patient may be acquired, e.g., by a camera that is integral with a computing device operated by the triage nurse, by a standalone camera, and/or by a vital sign acquisition camera (in which case at least some vital signs may be optionally acquired at registration). As will be described in more detail below, in some embodiments, the digital images acquired by the camera during registration at block 108 may be referred to as "intake digital images." Subsets of these intake digital images—and in some cases, selected sub-portions of these images that depict, for instance, faces—may be selectively retained as "subject reference templates" that can be used later to identify patients (or more generally, "subjects") in areas such as waiting room 104.

In many instances, the triage nurse additionally may acquire various initial vital signs and/or physiological parameters at block 110 using various medical instruments. These initial vital signs and/or physiological parameters may include but are not limited to blood pressure, pulse, glucose level, $SpO_2$, photoplethysmogram ("PPG"), respiration rate (e.g., breathing rate), temperature, skin color, and so forth. While not depicted in FIG. 1, in some embodiments, other information may be gathered at triage as well, such as acquiring/updating a patient's medical history, determining patient allergies, determining patient's use of medications, and so forth. In some embodiments, the patient may be assigned a so-called "patient acuity measure," which may be a measure that is used to rank a severity of the patient's ailment, and in some instances may indicate an anticipated need for emergency room resources. Any number of commonly used indicators and/or clinician decision support ("CDS") algorithms may be used to determine and/or assign a patient acuity measure, including but not limited to the Emergency Severity Index ("ESI"), the Taiwan Triage System ("TTS"), the Canadian Triage and Acuity Scale ("CTAS"), and so forth. For example, in some embodiments, vital signs of the patient may be compared with predefined vital sign thresholds stored in a system database, or with published or known vital sign values typical for a given patient age, gender, weight, etc., to determine the patient's initial patient acuity measure and/or the patient's initial position in the patient queue. In some embodiments, various physiological and other information about the patient may be applied as input across a trained model (e.g., regression model, neural network, deep learning network, etc.), case-based reasoning algorithm, or other clinical reasoning algorithm to derive one or more acuity measures. In some embodiments, the information used for deriving the acuity measure may include or even be wholly limited to vitals or other information that may be captured by the vital sign acquisition camera. In some embodiments, the information used for deriving the acuity measure may alternatively or additionally include information such as information from a previous electronic medical record ("EMR") of the patient, information acquired from the patient at triage, information from wearable devices or other sensors carried by the patient, information about other patients or people in the waiting room (e.g., vitals of others in the room), information about family members or others associated with the patient (e.g., family member EMRs), etc.

Once the patient is registered and/or triaged, at block 112, the patient may be sent to waiting room 104. In many scenarios, the operations of FIG. 1 may occur in slightly different orders. For example, in some instances, a patient may first be registered, then go to a waiting room until they can be triaged, and then be send to a doctor some time after triage (either immediately or after being sent back to the waiting room). In some situations, such as emergency situations (e.g., during disasters), patients may go straight to triage and then to a doctor, and may only be registered later when the patient has been stabilized.

At block 114, it may be determined, e.g., using one or more cameras, sensors, or input from medical personnel, that a patient has left the waiting room. Block 114 may include scanning each person currently within the waiting room (e.g., as part of a seeking function that attempts to locate the patient once the patient is at the top of a queue of patients for which vitals are to be captured, such as an execution of block 120 described below, or cycling through each person in the room to capture vitals, as multiple executions of the loop including blocks 118 and 120 described below) and determining that the patient was not located. In some embodiments, the system may wait until a predetermined number of instances of the patient missing is reached or a predetermined amount of time has passed during which the patient is missing before the patient is deemed to have left the waiting room to account for temporary absences (e.g., visiting the restroom or speaking with clinical staff). For example, the patient may have been taken into the ER proper because it is their turn to see a doctor. Or the patient's condition may have improved while they waited, causing them to leave the hospital. Or the patient may have become impatient and left to seek care elsewhere. Whatever the reason, once it is determined that the patient has left the waiting room for at least a threshold amount of time, at block 116, the patient may be deemed to have left without being seen and may be released from the system, e.g., by removing them from a queue in which registered patients are entered.

At block 118, a patient in waiting room 104 may be selected for monitoring. For example, in some embodiments, a database (e.g., subject reference database 412 in FIG. 4) storing registration information obtained at blocks 108-110 may be searched to select a patient having the highest patient acuity measure or a patient having the highest acuity measured that has not been monitored recently, as may be determined by a time threshold set for all patients or set (e.g., inversely correlated) based on the acuity measure. In other embodiments, registration information associated with a plurality of patients in the waiting room may be ranked in a patient monitoring queue, e.g., by their respective patient acuity measures, in addition to or instead of other measures such as waiting times, patient presence in the waiting room (e.g., missing patients may be selected for monitoring more frequently to determine whether they should be released if repeatedly absent), etc. In yet other embodiments, patient acuity measures may not be considered when ranking the patient monitoring queue, and instead only considerations of patient waiting times, patient presence, etc., may be considered.

However such a patient monitoring queue is ranked, in some embodiments, the first patient in the queue may be selected as the one to be monitored next. It is not required (though it is possible) that the patient monitoring queue be stored in sequence of physical memory locations ordered by patient acuity measures. Rather, in some embodiments, a ranked patient monitoring queue may merely include a rank or priority level value associated with each patient. In other words, a "patient monitoring queue" as described herein may refer to a "logical" queue that is logically ranked based on patient acuity measures, waiting time etc., not necessarily a contiguous sequence of memory locations. Patients may be selected for monitoring at block 118 in an order of their respective ranking in the patient monitoring queue.

At block 120, the patient selected at block 118 may be located in waiting room 104. In various embodiments, one or more cameras, such as one or more vital sign acquisition cameras (not depicted in FIG. 1, see FIGS. 2, and 3), that are deployed in or near waiting room 104 may be operated (e.g., panned, tilted, zoomed, etc.) to acquire one or more digital images of patients in waiting room 104. As will be described in more detail below, those acquired digital images may be compared to one or more reference patient images (often referred to herein as "subject reference templates") captured during registration at block 108.

At block 122, one or more vital sign acquisition cameras mounted or otherwise deployed in or near waiting room 104 may be operated to perform unobtrusive (e.g., contactless) acquisition of one or more updated vital signs and/or physiological parameters from the patient selected at block 118 and located at block 120. These vital sign acquisition cameras may be configured to acquire (without physically contacting the patient) a variety of different vital signs and/or physiological parameters from the patient, including but not limited to blood pressure, pulse (or heart) rate, skin color, respiratory rate, SpO$_2$, temperature, posture, sweat levels, and so forth. In some embodiments, vital sign acquisition cameras may be equipped to perform so-called "contactless methods" to acquire vital signs and/or extract physiological information from a patient may be used as medical image devices. Non-limiting examples of such cameras are described in United States Patent Application Publication Nos. 20140192177A1, 20140139656A1, 20140148663A1, 20140253709A1, 20140235976A1, and U.S. Pat. No. 9,125,606B2, which are incorporated herein by reference for all purposes.

At block 124, it may be determined, e.g., by one or more components depicted in FIG. 2 (described below), based on a comparison of the updated vital sign(s) and/or physiological parameters acquired at block 122 to previously-acquired vital signs and/or physiological parameters (e.g., the initial vital signs acquired at block 110 or a previous iteration of updated vital signs/physiological parameters acquired by the vital sign acquisition cameras), whether the patient's condition has changed. For example, it may be determined whether the patient's pulse rate, respiratory rate, blood pressure, SpO2, PPG, temperature, etc. has increased or decreased while the patient has waited. If the answer is no, then control may proceed back to block 118, and a new patient (e.g., the patient with the next highest patient acuity measure) may be selected and control may proceed back to block 120. However, if the answer at block 124 is yes (i.e. the patient's condition has changed), then control may pass to block 126. In some embodiments, the patient's condition may be represented (at least partially) by the same acuity measure used for purposes of determining monitoring order.

At block 126, it may be determined (again, by one or more components of FIG. 2) whether a medical alert is warranted based on the change detected at block 124. For example, it may be determined whether a change in one or more vital signs or patient acuity measures satisfies one or more thresholds (e.g., has blood pressure increased above a level that is considered safe for this particular patient?). If the answer is yes, then control may pass to block 128. At block 128, an alarm may be output, e.g., to a duty nurse or other medical personnel, that the patient is deteriorating. The medical personnel may then check on the patient to determine if remedial action, such as immediately admitting to the ED to see a doctor, is warranted. In some embodiments, control may then pass back to block 118. However, if the answer at block 126 is no, then in some embodiments, control may pass back to block 118.

Figure 2:
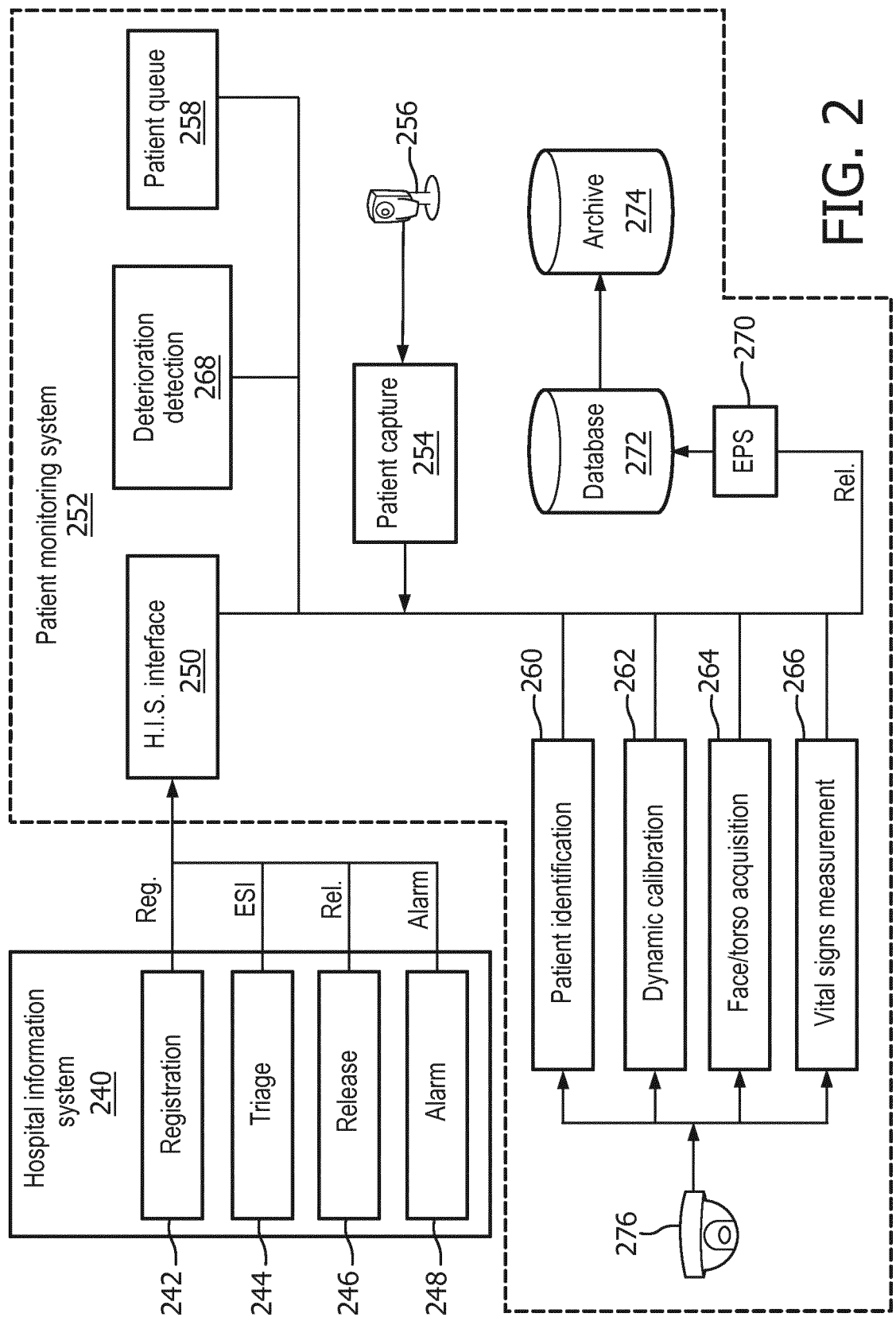
FIG. 2 illustrates an example environment in which various components of the present disclosure may implement selected aspects of the present disclosure, in accordance with various implementations.

FIG. 2 depicts example components that may be used to practice disclosed techniques, in accordance with various embodiments. A hospital information system 240 may be of the type that is commonly found in hospitals, doctor's offices, and so forth. Hospital information system 240 may be implemented using one or more computing systems that may or may not be connected via one or more computer networks (not depicted). Hospital information system 240 may include, among other things, a registration module 242, a triage module 244, a release module 246, and an alarm module 248. One or more of modules 242-248, or any other module or engine described herein, may be implemented using any combination of hardware and software, including one or more microprocessors executing instructions stored in memory. For example, the registration module 242 may include registration instructions implementing the functionality described herein in connection with registration executing on a processor while the triage module 244 may include triage instructions implementing the functionality described herein in connection with triage executing on the same processor. Similar underlying hardware and software may be used to implement other "modules" described herein.

Registration module 242 may be configured to receive, e.g., as manual input from a duty nurse, registration information of new patients. This may include, for instance, the patient's name, age, insurance information, and so forth. Triage module 244 may be configured to receive, e.g., as manual input from a duty nurse or directly from networked medical equipment, vital signs such as those described above and/or other physiological data, such as weight, height, the patient's reason for the visit, etc. In various embodiments, vital signs received by triage module 244 and/or a patient acuity measure (e.g., ESI in FIG. 2) may be associated with corresponding patient information received by registration module 242, e.g., in one or more databases (not depicted) associated with hospital information system 240.

Alarm module 248 may be configured to receive information indicative of various events, such as patient deterioration, and raise various alarms and/or alerts in response. These alarms and/or alerts may be output using a variety of modalities, including but not limited to visual output (e.g., on display screens visible to hospital personnel), intercom announcements, text messages, emails, audio alerts, haptic alerts, pages, pop-up windows, flashing lights, and so forth. Modules 242-248 of hospital information system 240 may be operably coupled, e.g., via one or computer networks (not depicted), to a hospital information system interface 250 ("H.I.S. Interface" in FIG. 2).

Hospital information system interface 250 may serve as an interface between the traditional hospital information system 240 and a patient monitoring system 252 configured with selected aspects of the present disclosure. In various embodiments, the hospital information system interface 250 may publish, e.g., to other modules of the patient monitoring system 252, various information about patients such as registration information, patient acuity measures (e.g., ESI), prescribed and/or administered medications, whether a patient has been released, various alarms/alerts, and so forth. As will be described below, in some embodiments, these publications may be provided to an event publish and subscribe ("EPS") module 270, which may then selectively store them in database 272 and/or selectively publish them to other modules of patient monitoring system 252. In some embodiments, hospital information system interface 250 may additionally or alternatively subscribe to one or more alerts or publications provided by other modules. For example, hospital information system interface 250 may subscribe to alerts from deterioration detection module 268, e.g., so that hospital information system interface 250 may notify appropriate components of hospital information system 240, such as alarm module 248, that a patient is deteriorating. EPS is just one of many possible protocols that could be used for communication among system components, and is not meant to be limiting.

Patient monitoring system 252 may include a variety of components that facilitate monitoring of patients in an area such as waiting room 104 to ensure that patients are served in a manner conducive with their actual medical condition. Patent monitoring system 252 may include, for instance, a patient capture module 254 that interfaces with one or more cameras 256, a patient queue module 258, a patient identification module 260, a dynamic calibration module 262, a face/torso acquisition module 264, a vital signs measurement module 266, a deterioration detection module 268, the aforementioned EPS module 270, and one or more databases 272, 274. As noted above, each of modules 250, 254, and 258-270 may be implemented using any combination of hardware and software. And while these modules are depicted separately, that is not meant to be limiting or to suggest each is implemented on a separate piece of hardware. For example, one or more modules may be combined and/or omitted, and one or more modules may be implemented on one or more computing systems operably connected via one or more computer networks (not depicted). The lines depicted connecting various components of FIG. 2 may represent communication channels accessible to these components. These communication channels may be implemented using any number of networking or other computer communication technologies, such as one or more buses, Ethernet, Wi-Fi, Bluetooth, Z-Wave, ZigBee, cellular communication, and so forth.

Patient monitoring system 252 may also include one or more vital sign acquisition cameras 276 that are configured to acquire, from some distance from a patient, one or more vital signs and/or physiological parameters of the patient. Examples of such vital sign acquisition cameras were described above. In various embodiments, a vital sign acquisition camera 276 may be a pan-tilt-zoom ("PTZ") camera that is operable to pan, tilt, and zoom so that different parts of an area such as waiting room 104 are contained within its FOV. In this manner, it is possible to scan the area being monitored to locate different patients, so that updated vital signs and/or physiological parameters may be acquired unobtrusively.

Patient capture module 254 may receive, from one or more cameras 256, one or more signals carrying captured image data of a patient. For example, in some embodiments, patient capture module 254 may receive a video stream from camera 256. Patient capture module 254 may perform image processing (e.g., face detection, segmentation, shape detection to detect human form, etc.) on the video stream to detect when a patient is present, and may capture one or more reference digital images of the patient (e.g., the intake digital images described below) in response to the detection. In some embodiments, the reference digital images may be captured at a higher resolution than individual frames of the video stream, although this is not required. In some embodiments, camera 256 may be a standalone camera, such as a webcam, a PTZ camera (e.g., 276), and so forth, that is deployed in or near pre-waiting room area(s) 102. Subsets of the intake digital images captured by camera 256 may be used to generate subject reference templates that are associated with patients (and more generally, "subjects") and used later to identify patients in the area being monitored.

Patient queue module 258 may be configured to establish and/or maintain a priority queue, e.g., in a database, of the order in which patients in the area should be monitored. In various embodiments, the queue may be ordered by various parameters. In some embodiments, patients in the queue may be ranked in order of patient acuity measures (i.e. by priority). For example, the most critical patients may be placed at the front of the queue more frequently than less critical patients. In some embodiments, updated vital signs may be acquired from patients waiting in the area being monitored, such as waiting room 104, in an order of the queue. In other embodiments, updated vital signs may be acquired from patients in a FIFO or round robin order. In other embodiments, updated vital signs may be acquired from patients in an order that corresponds to a predetermined scan trajectory programmed into vital sign acquisition camera 276 (e.g., scan each row of chairs in order).

Patient identification module 260 may be configured with selected aspects of the present disclosure to use one or more digital images captured by vital sign acquisition camera 276 (or another camera that is not configured to acquire vital signs unobtrusively), in conjunction with subject reference templates captured by patient capture module 254, to locate one or more patients in the area being monitored (e.g., waiting room 104). Patient identification module 260 may analyze acquired digital images using various techniques described below to identify and locate patients (subjects). FIGS. 4-10, described below, demonstrate various aspects of various techniques that may be employed as part of recognizing/identifying/locating patients, or more generally, subjects, in any context.

In some embodiments, patient identification module 260 may search an area being monitored for particular patients from which to obtain updated vital signs. For example, patient identification module 260 may search the area being monitored for a patient selected by patient queue module 258, which may be, for instance, the patient in the queue having the highest patient acuity measure. In some embodiments, patient identification module 260 may cause vital sign acquisition camera(s) 276 to scan the area being monitored (e.g., waiting room 104) until the selected patient is identified.

Dynamic calibration module 262 may be configured to track the use of vital sign acquisition camera(s) 276 and calibrate them as needed. For instance, dynamic calibration module 262 may ensure that whenever vital sign acquisition camera 276 is instructed to point to a particular PTZ location, it always points to the exact same place. PTZ cameras may be in constant or at least frequent motion. Accordingly, their mechanical components may be subject to wear and tear. Small mechanical errors/biases may accumulate and cause vital sign acquisition camera 276 to respond, over time, differently to a given PTZ command. Dynamic calibration module 262 may correct this, for instance, by occasionally running a calibration routine in which landmarks (e.g., indicia such as small stickers on the wall) may be used to train a correction mechanism that will make vital sign acquisition camera 276 respond appropriately Once a patient identified by patient queue module 258 is recognized/located by patient identification module 260, face/torso acquisition module 264 may be configured to pan, tilt, and/or zoom one or more vital sign acquisition cameras 276 so that their fields of view capture a desired portion of the patient. For example, in some embodiments, face/torso acquisition module 264 may pan, tilt, or zoom a vital sign acquisition camera 276 so that it is focused on a patient's face and/or upper torso. Additionally or alternatively, face/torso acquisition module 264 may pan, tilt, or zoom one vital sign acquisition camera 276 to capture predominantly the patient's face, and another to predominantly capture the patient's torso. Various vital signs and/or physiological parameters may then be acquired. For instance, vital signs such as the patient's pulse rate and $SpO_2$ may be obtained, e.g., by vital signs measurement module 266, by performing image processing on an video of the patient's face captured by vital sign acquisition camera(s) 276. Vital signs and/or physiological parameters such as the patient's respiratory rate, and so forth may be obtained, e.g., by vital signs measurement module 266, by performing image processing on an video of the patient's torso captured by vital sign acquisition camera(s) 276. Of course, the face and torso are just two examples of body portions that may be examined to obtain vital signs, and are not meant to be limiting.

Deterioration detection module 268 may be configured to analyze various signals and/or data to determine whether a condition of a registered patient (or even non-registered companions) is deteriorating, improving, and/or remaining stable. In some embodiments, the patient condition may be represented, at least in part, by the same patient acuity measures described above for determining order of patients for monitoring. As such, the deterioration detection module 268 may include one or more CDS, case-based reasoning, or other clinical reasoning algorithms as described herein or other clinical reasoning algorithms (e.g., trained logistic regression models or other machine learning models) for assessing patient condition measures other than acuity measures described herein. In some embodiments, the algorithms for assessing patient acuity or other measures of patient condition employed by the deterioration detection module 268 may be updated from time to time by, for example, writing new trained weights (e.g., theta values) for a selected machine learning module or providing new instructions for execution by a processor (e.g. in the form of a java archive, JAR, file or compiled library). These signals may include, for instance, a patient's initial vital signs and other physiological information (e.g., obtained at blocks 108-110 of FIG. 1), updated vital signs obtained by vital signs measurement module 266, a patients initial patient acuity measure (e.g., calculated during registration), and/or a patient's updated patient acuity measure (e.g., calculated based on updated vital signs and/or physiological parameters received from vital signs measurement module 266).

Based on determinations made using these data and/or signals, deterioration detection module 268 may send various alerts to various other modules to take various actions. For example, deterioration detection module 268 may publish an alert, e.g., by sending the alert to EPS module 270 so that EPS module can publish the alert to subscribed modules, such as alarm module 248 of hospital information system 240. In some embodiments, such an alert may include, for instance, a patient's name (or more generally, a patient identifier), a picture, live video stream, the patient's last detected location in the waiting room, baseline vital signs, one or more updated vital signs, and/or an indication of a patient acuity measure. On receipt of the alert, alarm module 248 may raise an alert or alarm to medical personnel of the patient's deterioration and, among other things, the patient's last detected location in the waiting room.

EPS module 270 may be a general communication hub that is configured to distribute events released by various other components of FIG. 2. In some embodiments, all or at least some of the other modules depicted in FIG. 2 may generate events that indicate some form of result/determination/computation/decision from that module. These events may be sent, or "published," to EPS module 270. All or some of the other modules depicted in FIG. 2 may elect to receive, or "subscribe to," any event from any other module. When EPS module 270 receives an event, it may send data indicative of the event (e.g., forward the event) to all modules that have subscribed to that event.

In some embodiments, EPS module 270 may be in communication with one or more databases, such as database 272 and/or archive 274 (which may be optional). In some embodiments, EPS module 270 may accept remote procedure calls ("RPC") from any module to provide access to information stored in one or more databases 272 and/or 274, and/or to add information (e.g., alerts) received from other modules to databases 272 and/or 274. Database 272 (which may be the same as subject reference database 412 in some embodiments) may store information contained in alerts, publications, or other communications sent/broadcast/transmitted by one or more other modules in FIG. 2. In some embodiments, database 272 may store, for instance, subject reference templates associated with patients and/or their initial vital signs, updated vital signs (acquired by vital sign acquisition camera 276), and/or patient acuity measures. Optional archive 274 may in some embodiments store the same or similar information for a longer period of time.

It will be apparent that various hardware arrangements may be utilized to implement the patient monitoring system 252. For example, in some embodiments, a single device may implement the entire system 252 (e.g., a single server to operate the camera 276 to perform the vital signs acquisition functions 260-266 and to perform the vital sign(s) analysis and alerting functions including deterioration detection 268 and patient queue management 258). In other embodiments, multiple independent devices may form the system 252. For example, a first device may drive the vital sign acquisition camera 276 and implement functions 260-266 while another device(s) may perform the remaining functions. In some such embodiments, one device may be local to the waiting room while another may be remote (e.g., implemented as a virtual machine in a geographically distant cloud computing architecture). In some embodiments, a device (e.g., including a processor and memory) may be disposed within the vital sign acquisition camera 276 itself and, as such, the camera 276 may not simply be a dumb peripheral and, instead may perform the vital signs functions 260-266. In some such embodiments, another server may provide indications (e.g. identifiers, full records, or registered facial images) to the camera 276 to request that vitals be returned for further processing. In some such embodiments, additional functionality may be provided on-board the camera 276 such as, for example, the deterioration detection 268 (or preprocessing therefor) and/or patient queue module 258 management may be performed on-board the camera 276. In some embodiments, the camera 276 may even implement the HIS interface 250 or EPS 270. Various additional arrangements will be apparent.

Figure 3:
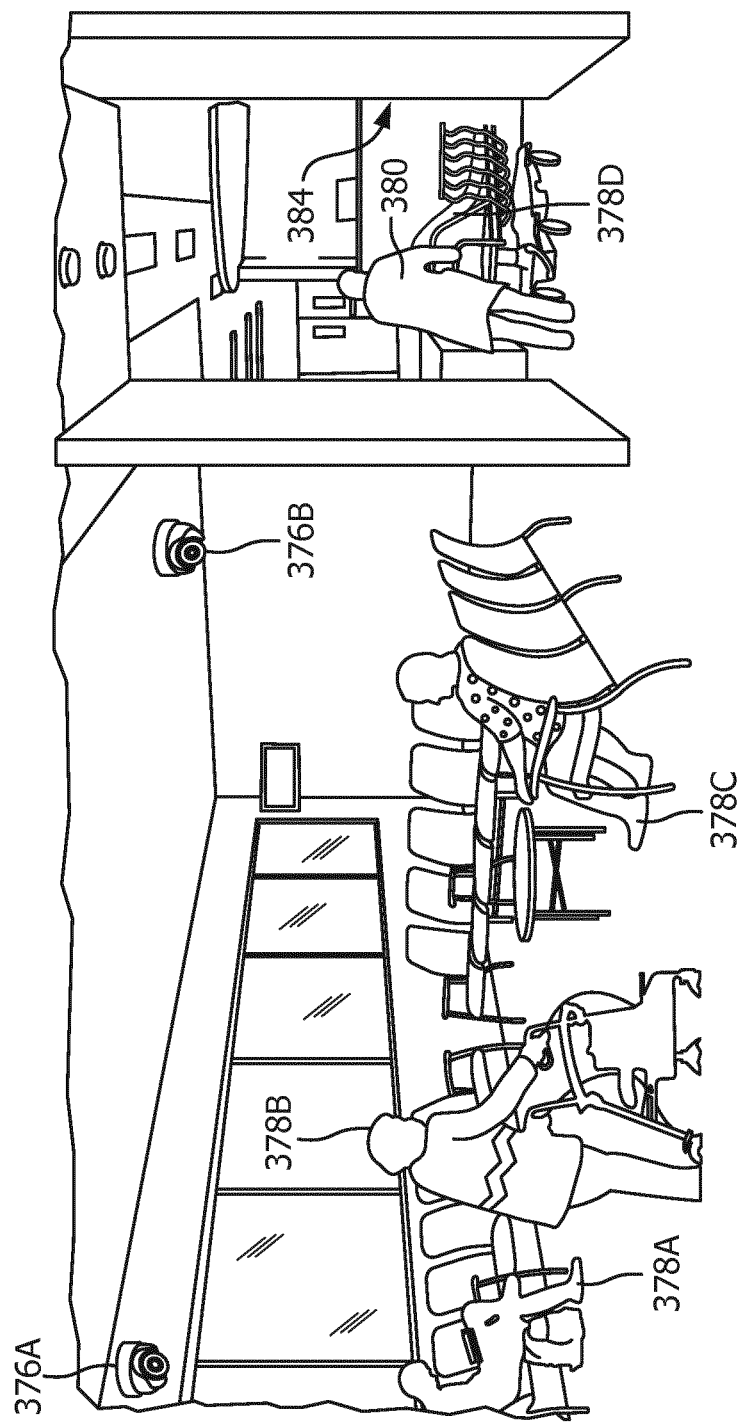
FIG. 3 depicts an example scenario in which disclosed techniques may be practiced, in accordance with various embodiments.

FIG. 3 illustrates an example scenario in which disclosed techniques may be implemented to identify patients 378A-C in a waiting room 304 for monitoring purposes. In this example, three patients 378A-C are waiting in a hospital waiting room 304 to be attended to by medical personnel 380. Two video cameras 376A, 376B are mounted on a surface (e.g., ceiling, wall) of waiting room 304. The two video cameras 376A, 376B may be used to monitor patients 378 in waiting room 304. The patients 378A-C may each be assigned a patient acuity measure by triaging medical personnel (not depicted) based on a preliminary patient condition analysis. As the patients 378 wait for an attending physician, the two video cameras 376A, 376B may capture digital image(s) that are analyzed using techniques described herein to identify patients selected for monitoring. The same video cameras (assuming they are configured to unobtrusively acquire vital signs) or different video cameras may then be operated to monitor patients 378 as described above, e.g., to detect patient deterioration. In some embodiments, a patient acuity measure associated with a patient may be updated by medical personnel in response to detection by patient monitoring system (more specifically, deterioration detection module 268) that a patient has deteriorated. In various embodiments, when a new patient enters waiting room 304, a new round of patient monitoring and prioritization may be performed, e.g., by patient monitoring system 252. The patient queue may be automatically updated, e.g., by patient queue module 258, each time a new patient enters waiting room 304. Additionally or alternatively, medical personnel may manually update the patient queue to include a newly-arrived patient after triaging.

Techniques described herein are not limited to hospital waiting rooms. There are numerous other scenarios in which techniques described herein may be implemented to identify/locate subjects in digital images or videos. For example, disclosed techniques may also be used for security monitoring of crowds in airports, arenas, border crossings, and other public places. In such scenarios, rather than monitoring patients to determine patient acuity measures, subjects may be identified for other purposes, such as risk assessments or post-event investigation. Techniques described herein may also be applicable in scenarios such as in fitness environments (e.g., gyms, nursing homes) or other surveillance scenarios (e.g., airports, border crossings, etc.) in which identification of individual subjects depicted in digital images may be implemented. For example, in airports, subjects waiting at gates could be identified, for example, by comparing images of subjects waiting at gates to subject reference templates obtained at checkin. In addition, techniques described herein may be used to identify patients who left without being seen, without requiring that patients' faces be visible.

Figure 4:
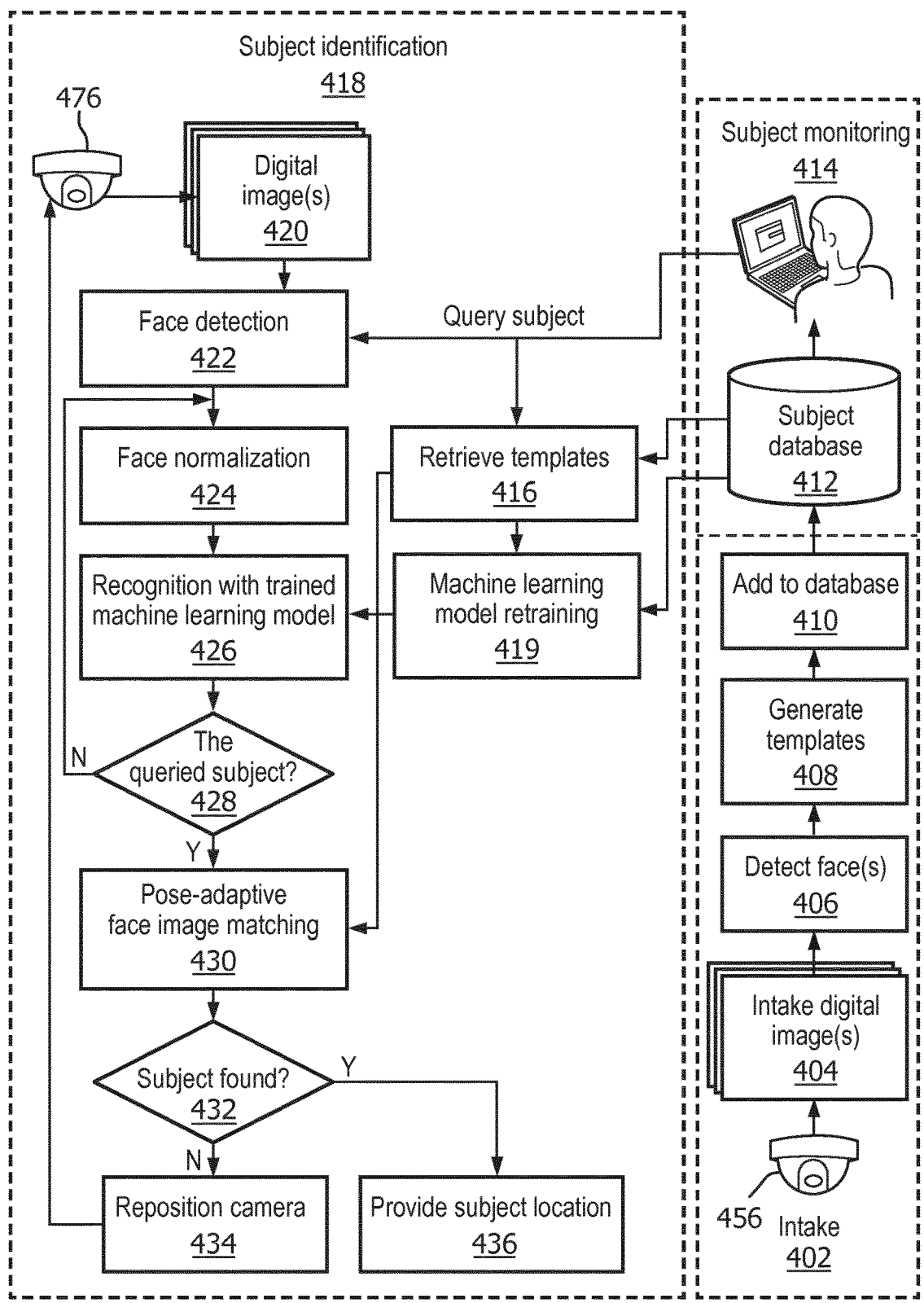
FIG. 4 depicts example components and operations for performing various aspects of the present disclosure.

FIG. 4 schematically depicts, at a relatively high level, an example of components configured with selected aspects of the present disclosure, as well as example interactions between those components. In various embodiments, one or more of these components may be implemented using any combination of hardware and software, e.g., as part of patient monitoring system 252 in FIG. 2. For example, the components of FIG. 4 may be used at block 108 of FIG. 1 to register a subject such as a patient in a subject reference database 412. Along with the subjects' intake information (e.g., age, gender, name, initial vital signs, etc.), any number of "subject reference templates" that comprise digital images of the subject's face from multiple views (e.g., different angles, different facial expressions, different lighting conditions, different head positions, etc.) may be selected and associated with the subject in the subject reference database 412, e.g., by way of a medical record number ("MRN"). These subject reference templates may then be used later, e.g., by patient identification module 260, to identify the subject in an area such as a waiting room using another camera (e.g., vital sign acquisition cameras 276, 376) that captures the waiting room in its field of view. Once the subject is identified, the subject's location can be used for various purposes, such as being contacted by medical personnel, having vital signs unobtrusively acquired, etc.

Starting at bottom right, an intake routine 402 is depicted that includes operations for intake of a newly-registered subject (e.g., registering and/or triaging a new patient) and adding that subject to a subject reference database 412, in accordance with various embodiments. A first camera 456 may be configured to capture one or more of what will be referred to herein as "intake" digital images 404 (e.g., individual images and/or a stream of images such as a video stream). First camera 456, which may correspond to camera 256 in FIG. 2 in some instances, may take various forms, such as a webcam positioned in the intake area (e.g., registration and/or triage), a camera integral with a computing device operated by intake personnel (e.g., a triage nurse), etc. This image capture may be un-intrusive to both the intake personnel and the subject, as it may occur automatically with little or no human intervention (although this is not meant to be limiting).

Figure 6:
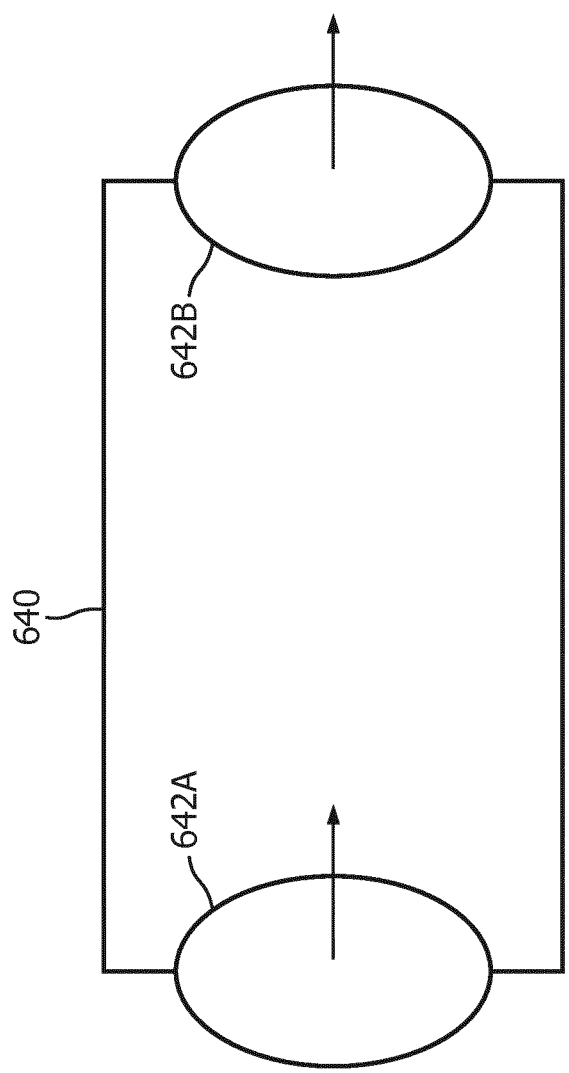
FIG. 6 depicts an example of how a subject may be detected entering and/or leaving a camera's field of view, in accordance with various embodiments.

At block 406, intake digital image(s) 404 may be analyzed, e.g., by one or more computing systems operably coupled with camera 456 (e.g., patient capture module 254 in FIG. 2) to detect one or more portions of digital images 404 that depict a face of a subject currently located in an intake area (e.g., registration and/or triage). FIG. 6 demonstrates one example technique for detecting the subject's face.

Figure 5:
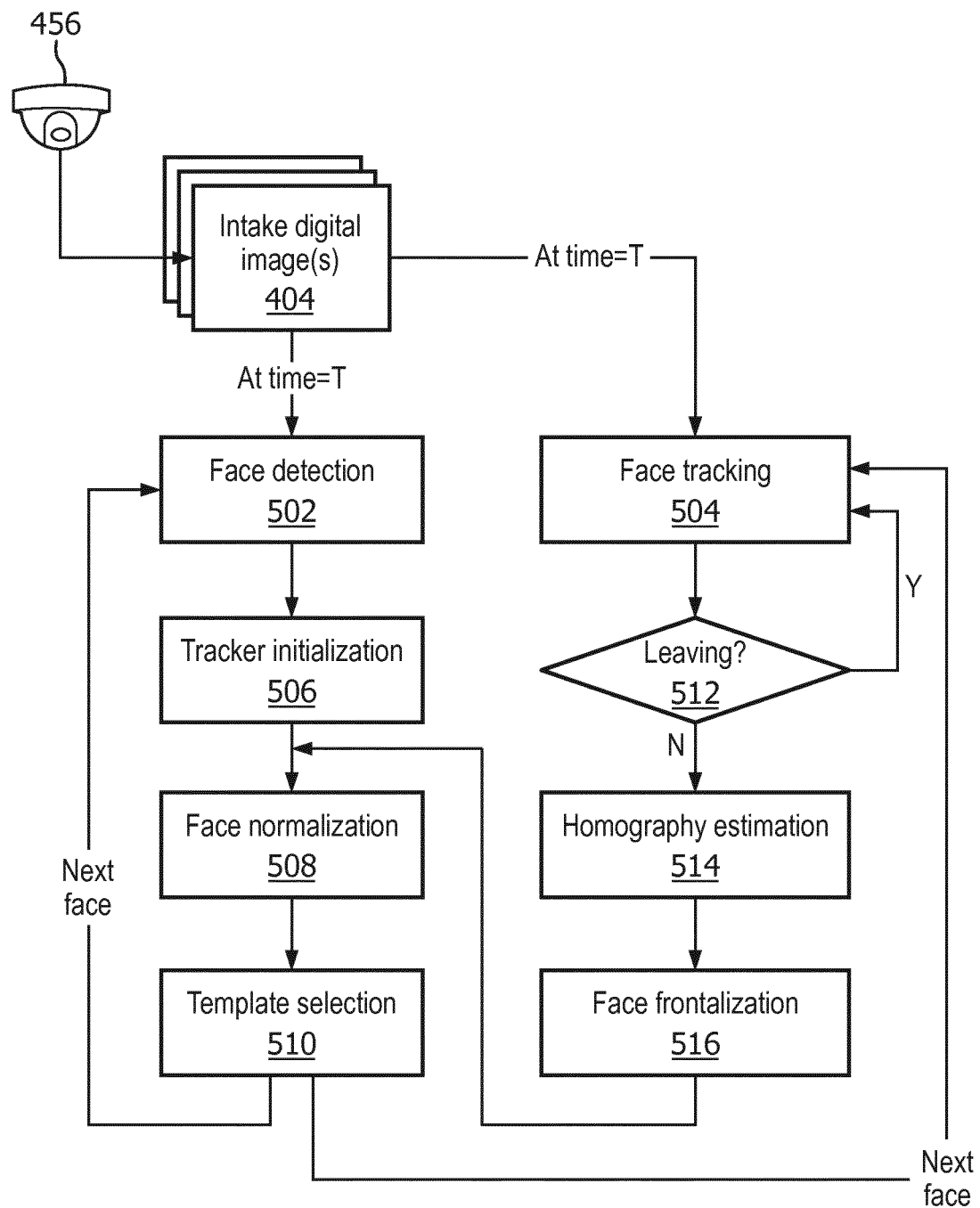
FIG. 5 depicts an example of how subject reference templates may be selected from intake digital images for generation of subject reference templates, in accordance with various embodiments.
Figure 8:
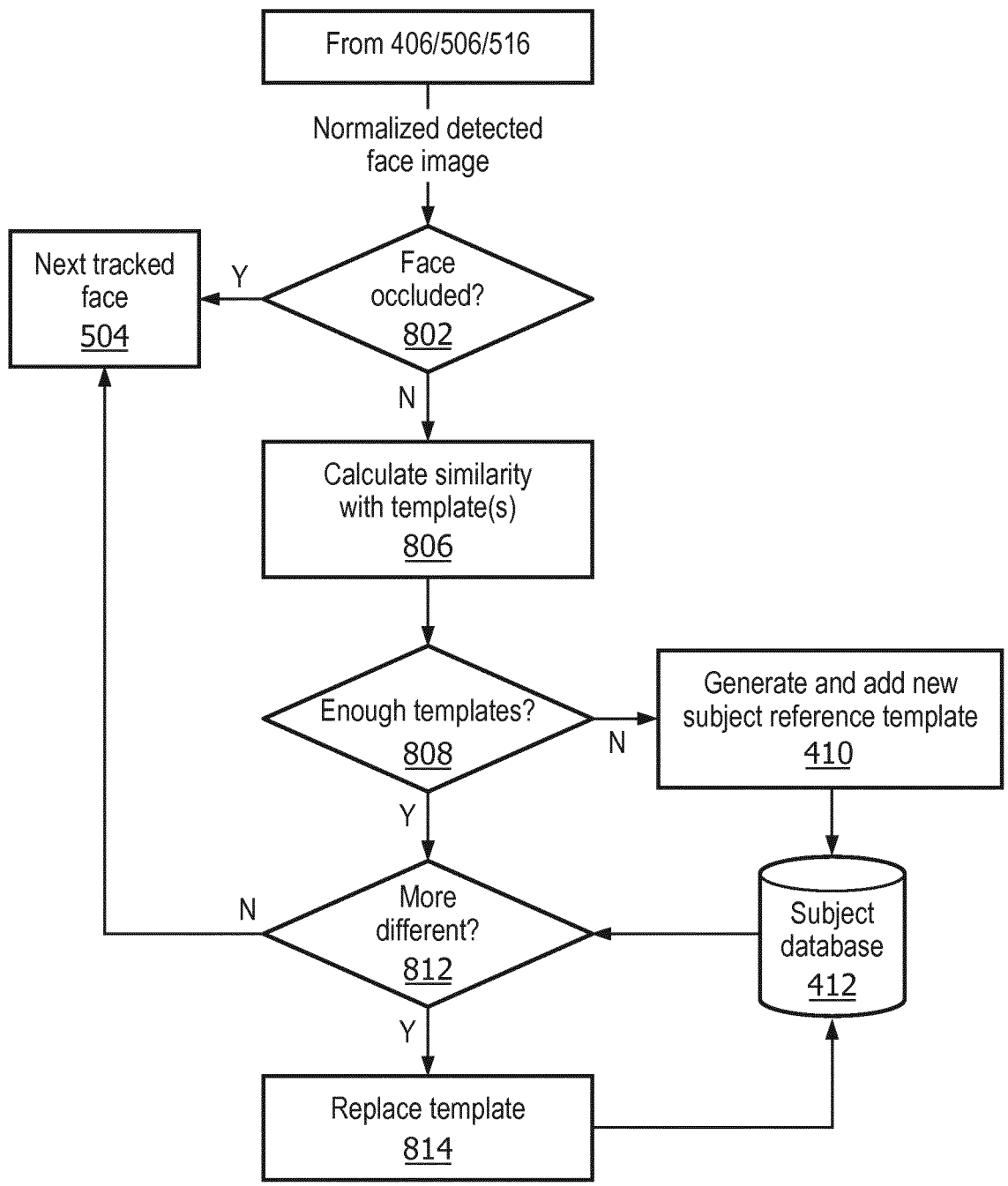
FIG. 8 depicts, in greater detail than FIG. 5, an example of how subject reference templates may be selected from intake digital images, in accordance with various embodiments.

At block 408, a subset of intake digital images that depict multiple different views of a face of the subject may be selected from plurality of intake digital images 404. The selected subset may be used to generate subject reference templates that are used to visually identify/locate the subject later. In some embodiments, the subset of intake digital images used to generate the subject reference templates may be selected based on being sufficiently dissimilar to one or more other intake digital images. FIGS. 5 and 8 below demonstrate example techniques for selecting subsets of intake images for generation of subject reference templates.

At block 410, the generated subject reference templates may be stored, e.g., in subject reference database 412, in association with the subject. In various embodiments, the generated subject reference templates may be stored in subject reference database 412 in association with information related to the subject, e.g., by way of the aforementioned MRN. More generally, subject reference database 412 may store subject reference templates related to a plurality of subjects, such as a plurality of registered patients in waiting room 104 that may be awaiting medical treatment.

Moving to top right, a subject (e.g., patient) monitoring routine 414 is depicted that demonstrates one example of how a particular subject (e.g., patient) may be selected, e.g., by medical personnel such as a duty nurse and/or automatically (e.g., based on a patient acuity measure of the subject), as well as how a query may be issued that seeks to locate the subject in an area such as a waiting room, in accordance with various embodiments. The subject under consideration will heretofore be referred to as the "queried subject."

At block 416, subject reference templates associated with the queried subject may be retrieved from subject reference database 412, e.g., by patient identification module 260. Meanwhile, as part of an ongoing patient identification routine 418 that may be performed, for instance, by patient identification module 260 of FIG. 2, another camera 476, which may or may not take the form of a vital sign acquisition camera described previously, may be acquiring digital images 420 that depict an area in which the queried patient is believed to be, such as waiting room 104.

At block 422, one or more portions of the digital image(s) 420 that depict faces of one or more subjects in the area may be detected, e.g., by patient identification module 260, as what will be referred to herein as "detected face images." In various embodiments, the operations of block 422 may be performed continuously and/or may be triggered by receipt of the subject query from patient monitoring routine 414. Similar techniques for face detection may be applied at block 422 as were applied at block 406, and will be described in more detail below.

Figure 7:
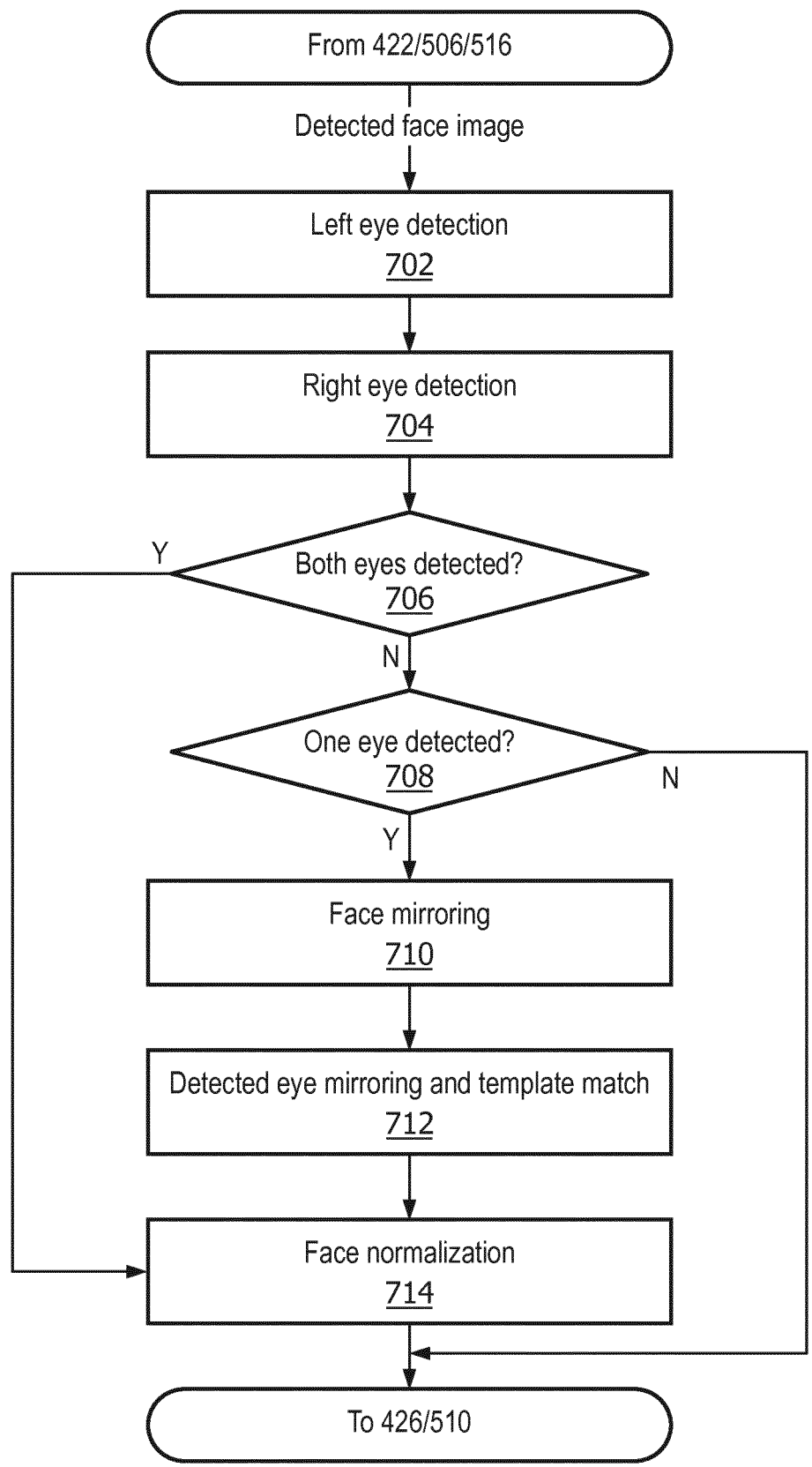
FIG. 7 depicts one example of how a detected face image may be normalized, e.g., to be front-facing, in accordance with various embodiments.

At block 424, one or more operations may be performed to normalize the faces depicted in the portions detected at block 422. For example, in some embodiments, geometric warping and/or other similar techniques may be employed to normalize detected faces to be at or near frontal views. FIG. 7 below demonstrates one example technique for normalizing detected faces. Thus, the output of block 424 may be a series of normalized detected face images.

In some embodiments, at block 426, a "first pass" of the normalized detected faces may be performed to obtain a preliminary match of the queried subject. For example, in some implementations, each of the detected face images may be applied as input across a trained machine learning model. In various embodiments, the machine learning model may take various forms, such as a linear discriminant analysis model, a support vector machine, a neural network, and so forth. In various embodiments, the machine learning model may be trained and/or dynamically retrained, e.g., at block 419, using the subject reference templates currently stored in subject reference database 412. In various embodiments, output generated via the machine learning model may include similarity scores between each input detected face image and each subject, or may include the subject that is most similar to the detected face image. For a given normalized detected face image, the registered subject that yields the highest similarity score (e.g., that satisfies some preset minimum threshold) may be identified as a match. For example, at block 428 of FIG. 4, it may be determined whether a queried subject is identified in a given detected face image. If the answer is no (e.g., a minimum threshold is not satisfied), then control may pass back to block 424 and the next detected face image may be normalized and applied as input across the machine learning model.

The machine learning model may be trained and/or dynamically retrained at block 419 at various times. In some embodiments, whenever a new patient record is created in subject reference database 412 or an existing patient is released from subject reference database 412, subject reference database 412 may publish an event, e.g., to EPS module 270. In response, EPS module 270 may trigger training of a new machine learning model, or retrain an existing machine learning model, based on the subject reference templates currently stored in subject reference database 412. In some contexts, such as in hospitals, this may be feasible because the number of patients in one day is generally not very large. Thus, a multi-class linear discriminant analysis machine learning model may be used because it is relatively inexpensive computationally to retrain, and thus can be retrained in near real time.

Figure 9:
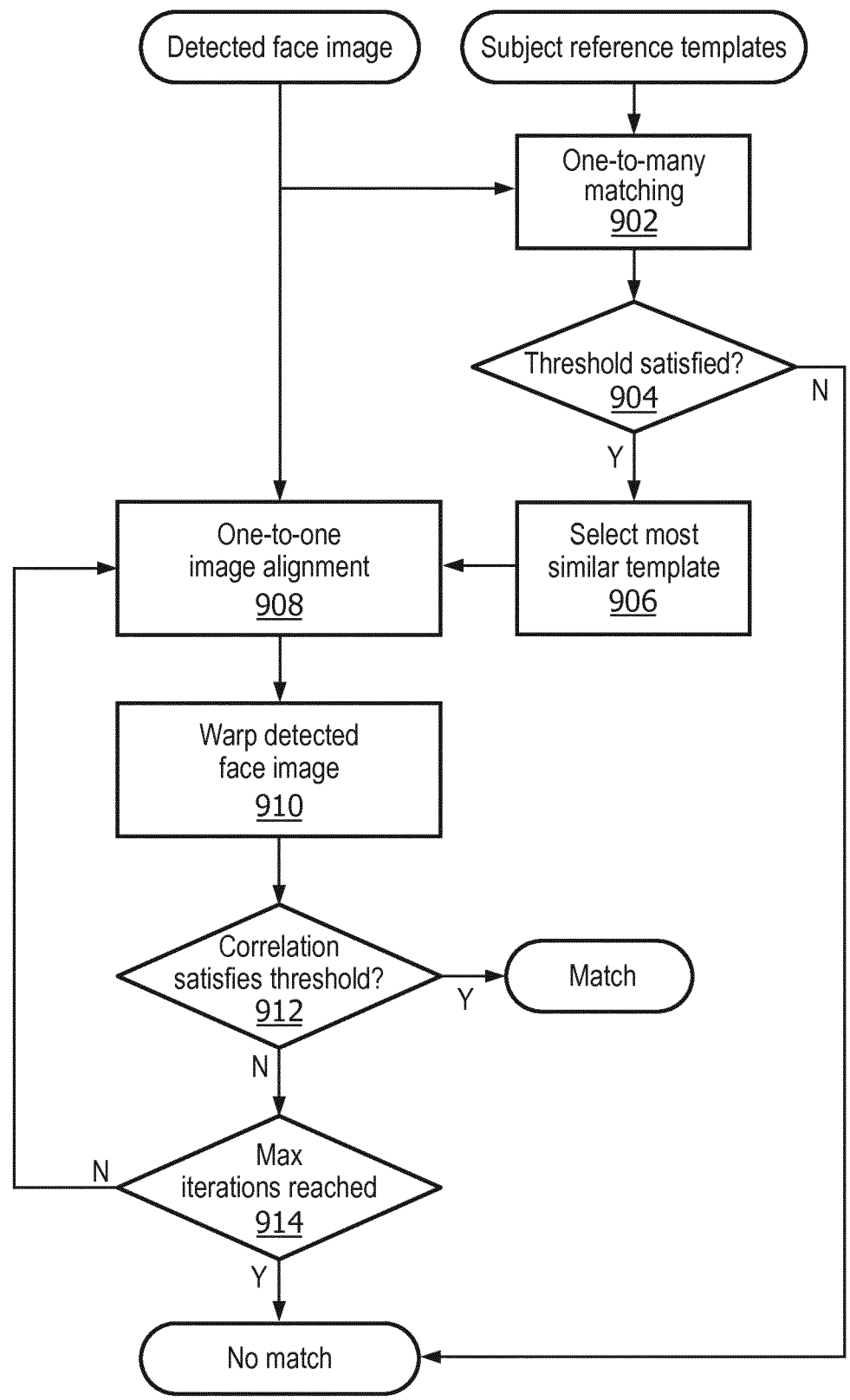
FIG. 9 depicts one example of pose-adaptive face image matching, in accordance with various embodiments.

Back at block 428, if the answer is yes, then in some embodiments, a "second pass" of testing may be applied to the normalized detected face image. For example, at block 430, so-called "pose-adaptive face image matching" may be applied in which the normalized detected face image is compared to each of the subject reference templates associated with the queried subject. FIG. 9 below demonstrates one example technique for performing pose-adaptive face image matching. As will be described below, pose-adaptive face image matching may be an iterative process that repeats a predetermined number of times to determine whether the normalized detected face image matched at blocks 426-428 is truly that of the queried subject. In other words, the operations of block 430 may serve to corroborate the initial finding of blocks 426-428.

At block 432, if it is determined that the normalized detected face image truly depicts the queried subject, then at block 436, the location associated with the normalized detected face image (e.g., a particular location such as a seat in a waiting room at which the subject is located) may be provided as output. On the other hand, if corroboration is not possible, e.g., because some predetermined similarity threshold is not met during the iterative pose-adaptive face image matching process, then at block 434, camera 476 may be repositioned (e.g., panned, tilted, zoomed) to focus on a different area, e.g., that contains different subject(s).

FIG. 5 depicts one example of how various aspects of the workflow of intake routine 402 may be implemented, in accordance with various embodiments. As described above, camera 456 may acquire intake digital images 404, e.g., as a video stream. In some embodiments, intake digital images 404 may depict an intake (e.g., triage) area, although this is not required. The operations depicted in FIG. 5 may be performed at various computing devices, such as a computing device that is operably coupled with camera 456 in or near the intake area.

In the intake (e.g., triage) area where a new subject is assessed (e.g., clinically assessed), for each new intake digital image (e.g., frame of a video stream) captured by camera 456, at blocks 502 and 504, respectively, face detection (e.g., of a new face) and face tracking (e.g., of a face detected in a previous intake digital image) may be performed in parallel. This ensures that a face of each subject in the intake area is detected, no matter which subject entered first. For each newly detected face, at block 506, a new face tracker is launched. This new face tracker will start its analysis at the next image frame. Then, at block 508, the newly detected face is normalized, e.g., to a near-frontal view (normalization is demonstrated in more detail in FIG. 7).

In some embodiments, this normalized detected face may be deemed a subject template candidate. Then, the new subject reference template candidate may be compared, e.g., at block 510, with existing subject reference template candidates (e.g., acquired from previous image frames), if any yet exist. Various criteria may be used to determine whether to keep the new subject reference template candidate, e.g., as a replacement of another previously-captured subject reference template candidate, or to discard the new subject reference template candidate. Ultimately, only the most representative subject reference templates candidates may be selected and retained in subject reference database 412. FIG. 8 demonstrates, in greater detail, one example of how intake digital images may be selected (510) for use in generating subject reference templates.

Turning now to face tracking block 504, for each tracked face previously detected in each intake image frame, at block 512, it may be determined whether the corresponding subject is leaving the camera's field of view. FIG. 6 depicts one example of how a determination may be made of whether a subject is leaving. If the answer at block 512 is yes, then operation passes back to block 504 and the next tracked face is selected. If the answer at block 512 is no, then at block 514, homography estimation may be performed, e.g., to estimate a three-dimensional head pose of the tracked face in the current intake image frame. Based on the estimated pose, the tracked face image in the current frame may be "frontalized" (removing the pose effect on face appearance) at block 516. Control may then pass to block 508.

FIG. 6 demonstrates one example technique for detecting a subject's face, e.g., during intake (e.g., at block 406) or later during subject monitoring (e.g., at block 422). A camera's field of view ("FOV") 640 is shown, and may be associated with any camera described herein, such as camera 456 or camera 476. FIG. 6 illustrates the both detection of a subject (642A) entering and a subject (642B) leaving. Both situations only happen when the subject's face is partially visible in FOV 640. The presence of a subject may be detected, for instance, by measuring the overlapping ratio of a face region to FOV 640. If the ratio is less than a particular number, such as one, and is increasing compared to the previous frame(s), the subject may be determined to be entering. Otherwise, if the ratio is greater than one and is decreasing compared to the previous frame(s), the subject may be determined to be leaving. If either of the two situations lasts for a predetermined time interval, such as five seconds, it is possible to determine that the subject has entered or left.

FIG. 7 depicts details of one example face normalization routine, e.g., that may be performed at block 424 of FIG. 4 and/or block 508 of FIG. 5. Input may take the form of a detected face image, e.g., from block 422 of FIG. 4 and/or from block 506/516 of FIG. 5. Output may be a normalized detected face image. At blocks 702 and 704, left and right eye detection operations may be performed (operations 702 and 704 may also be performed in the reverse order, or in parallel). These operations may include a variety of image processing techniques, such as edge detection, template matching, Eigenspace methods, Hough transforms, morphological operations, trained neural networks, etc. At block 706, if both eyes are successfully detected, control may pass to block 714, at which point the face may be normalized (e.g., geometric warping may be applied to the detected face image to make the face approximately frontal facing). From block 714, control may pass, for instance, to block 426 of FIG. 4 or to block 510 of FIG. 5.

If the answer at block 706 is no, then at block 708 it may be determined whether either eye was detected. If the answer is no, then control may pass downstream of operation 714, in some instances a failure event may be raised, and then control may proceed, e.g., to block 426 of FIG. 4 or to block 510 of FIG. 5. If only one eye was successfully detected at blocks 702-704, then at block 710, the detected eye region may be mirrored horizontally, and the mirror eye patch may be searched, e.g., using template matching, to locate the other eye. Then, operation may proceed to block 714, which was described previously.

FIG. 8 depicts one example of how detected face images may be selected as subject reference templates, e.g., for inclusion in subject reference database 412, at block 408 of FIG. 4 and block 510 of FIG. 5. Control may pass to the operations of FIG. 8 from various locations, such as block 406 of FIG. 4, block 508 of FIG. 5 (if the detected face image under consideration is newly detected in the current intake digital image frame), and/or block 516 of FIG. 5 (if the detected face image under consideration was detected in a prior intake digital image frame and is currently being tracked). At block 802, it may be determined whether the face is occluded. If the answer is yes, then control may pass to block 504, at which point the next tracked face (if any) may be analyzed.

If the answer at block 802 is no, then at block 806, image similarities between the current detected face image and any existing subject reference templates for the current subject may be determined. At block 808, it may be determined whether there are yet enough subject reference templates collected for the current subject. Various numbers of subject reference templates may be selected for each new subject. In some embodiments, as many as nine subject reference templates may be collected. While collecting more subject reference templates is feasible, diminishing returns may be experienced after some point.

If there are not yet enough subject reference templates collected for the current subject, then at block 408/410 (same as FIG. 4), the current detected face image may be used to generate a subject reference template that is then added to subject reference database 412. However, at block 808, if there are already enough templates collected, then in some embodiments, it may be determined whether the current detected face image is sufficiently different from previously-collected subject reference templates of the current subject to warrant replacing a previously-collected subject reference template. For example, at block, at block 812, a determination may be made of whether the current detected face image is more dissimilar from each previously-collected subject reference template than any of the previously-collected subject reference templates are from each other. If the answer is yes for a particular subject reference template, then the current detected face image may be used to generate a new subject reference template that replaces the particular subject reference template in subject reference database 412.

The operations of FIG. 8 (and more generally, the operations of FIG. 5) are repeated for every intake digital image captured by camera 456, and each subject may be tracked, for instance, until they leave the intake area (block 512). Consequently, of the total number of intake digital images acquired while the subject is in FOV 640 of camera 456, the n intake digital images having the most suitably (e.g., most diverse) views may be selected to generate subject reference templates for that particular subject. As mentioned previously, these subject reference templates may be used later, e.g., in response to a subject being queried at subject monitoring routine 414.

FIGS. 5 and 8 relate to collecting subject reference templates for each subject to be stored in subject reference database 412. FIGS. 6 and 7 relate to both to collecting subject reference templates and using those subject reference templates to identify subjects in areas downstream from intake areas, such as hospital waiting rooms. FIG. 9 relates to the latter. In particular, FIG. 9 depicts one example of operations that may be performed as part of the pose-adaptive face image matching operation of block 430 in FIG. 4. As noted above, in some embodiments, pose-adaptive face image matching may constitute a "second pass" after the initial subject matching performed at block 426, e.g., using a trained machine learning model. In various embodiments, the pose-adaptive face image matching may provide more accurate identification of a subject in an area (e.g., a patient in a waiting room) than the operations of block 426 alone.

The process of pose-adaptive face image matching generally relates to matching a detected face image (which may or may not be normalized) with one or more subject reference templates retrieved in response to a subject query, In particular, to eliminate or reduce matching error caused by spatial misalignment, detected face images may be repeatedly matched to reference subject templates by increasing a matching threshold and iteratively aligning the detected face images with the subject reference templates.

In FIG. 9, two inputs are received: the current detected face image under consideration and the subject reference templates associated with the queried subject (i.e., the subject being searched for). At block 902, both inputs may be used to perform a one-to-many matching between the single detected face image and the multiple subject reference templates associated with the queried subject. In some embodiments, a respective similarity score may be calculated between the detected face image and each subject reference template. At block 904, it may be determined whether one or more of the similarity scores satisfies a relatively small similarity threshold. If the answer at block 904 is no, then it may be determined that the subject depicted in the current detected face image does not match the subject reference templates, and the detected face image associated with the next detected subject in the area being monitored may be selected.

If the answer at block 904 is yes, then at block 906, the subject reference template that is most similar to the detected face image—e.g., the subject reference template for which the highest similarity score was calculated at block 902—may be selected. At block 908, the selected most similar subject reference template and the single detected face image may be aligned. For example, in some embodiments, a geometric error between the two may be calculated. Based on this geometric error, at block 910 the detected face image may be geometrically warped to the subject reference template. In some embodiments, this process may be iterated until, at block 912, some similarity threshold is satisfied (e.g., 0.9), or, at block 914, some maximum number of iterations has been reached. If the similarity threshold of block 912 is satisfied, a match is found between the detected face image and the subject associated with the subject reference template, and the subject depicted in the detected face image is identified as the queried subject. But, if the maximum number of iterations is reached at block 914 without satisfying this similarity threshold, then the subject depicted in the detected face image is indicated to not match the subject associated with the subject reference template.

When the detected face image under consideration is not matched to the subject reference template, in some embodiments, the camera (e.g., 276, 376, 476) that is monitoring an area such as a waiting room may be panned, tilted, and/or zoomed to capture another location of a particular number of locations in which subjects such as patients are likely to be found. These locations may correspond to, for instance, seats in a waiting room, exercise equipment in a gym, seats at an airport gate, etc. In some embodiments, PTZ control of camera 476 may be pre-calibrated to sequentially capture these locations. If the queried subject is not found at the current location, camera 476 may be sequentially repositioned through the remainder of the present locations until the queried subject has been found, or until all preset locations have been scanned. Alternatively, if no preset locations are available, in some embodiments, people detection techniques may be employed to determine locations of people generally in an area, and then each of those locations may be scanned. Additionally, if the queried subject is not found, especially when the queried subject is a patient admitted to a hospital emergency department, then one or more notifications may be sent to various personnel, such as hospital staff. In instances in which the absent subject is a patient being identified for unobtrusive monitoring using one or more vital sign acquisition cameras 276, the absent patient may be referred back to patient queue module 258 for reinsertion into the patient queue.

On the other hand, if the detected face image matches the subject reference template(s), an output may be provided, e.g., by patient identification module 260 to another module in FIG. 2 and/or to the personnel associated with subject monitoring 414 in FIG. 4. This output may indicate the location of the queried patient, e.g., in the waiting room or other area being monitored. Although not depicted in FIG. 9, in various embodiments, more than one detected face image may be acted upon at once, e.g., in parallel. For example, two or more separate detected face images captured within a FOV of a camera may be processed in parallel.

Figure 10:
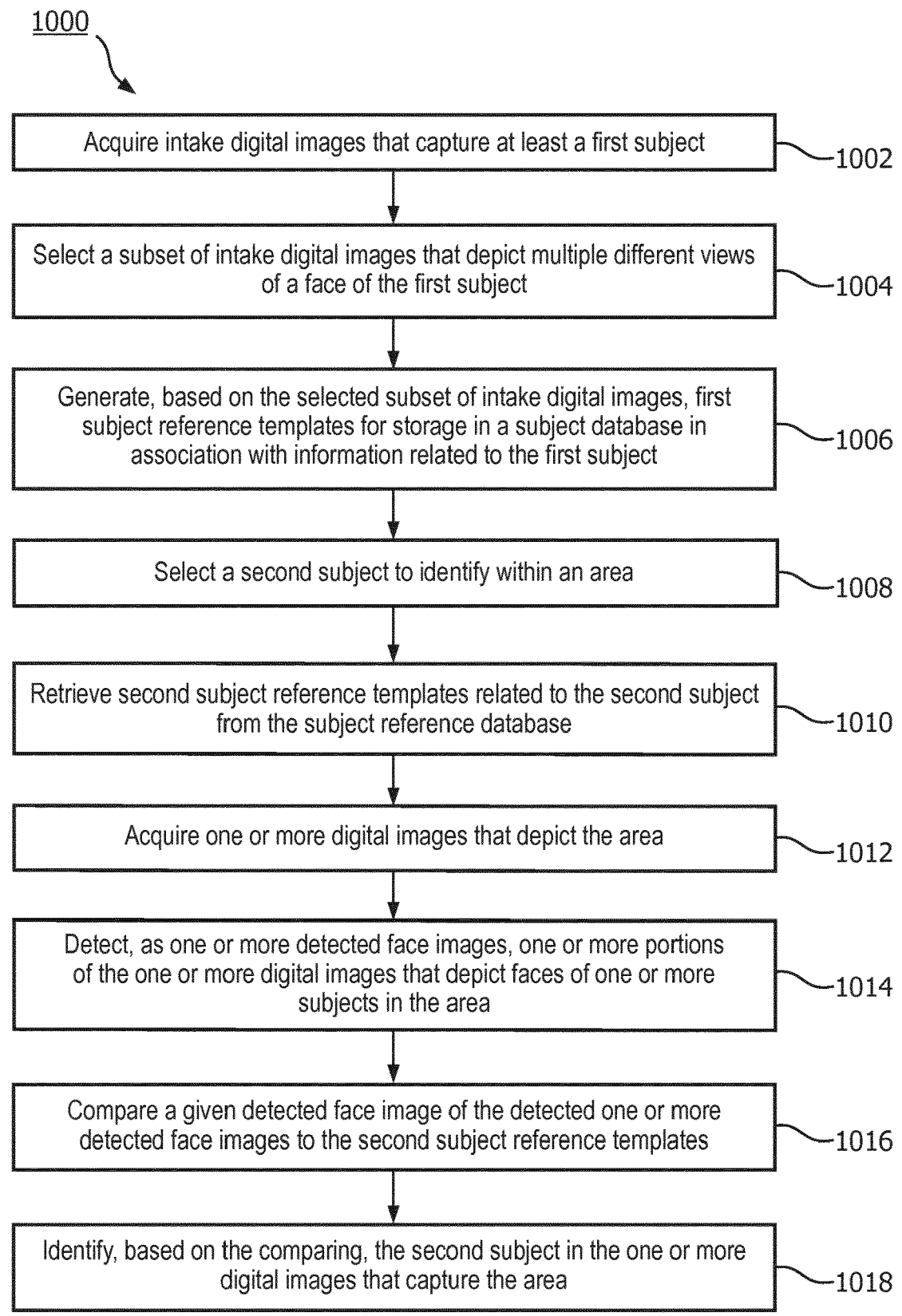
FIG. 10 depicts an example method for performing selected aspects of the present disclosure, in accordance with various embodiments.

FIG. 10 depicts an example method 1000 for practicing selected aspects of the present disclosure, in accordance with various embodiments. For convenience, the operations of the flow chart are described with reference to a system that performs the operations. This system may include various components of various computer systems, including patient monitoring system 252. Moreover, while operations of method 1000 are shown in a particular order, this is not meant to be limiting. One or more operations may be reordered, omitted or added.

At block 1002, the system may acquire a plurality of intake digital images that capture at least a first subject. For example, in some embodiments, patient capture module 254 may acquire a plurality of intake (e.g., pre-waiting room areas 102) digital images from camera 256. Camera 256 may be located in an intake area such as a hospital registration/triage, a check-in desk at an airport or train station, a check-in desk at a gym, an intake area associated with a border crossing, etc. In some embodiments, the plurality of intake digital images may include video frames that are captured for the entire time the subject is in the intake area (e.g., from the moment they are detected entering to the moment they are detected leaving), or for some other time interval, such as while triage is being performed, a manually-selected time interval, etc.

At block 1004, the system may select, from the plurality of intake digital images, a subset of intake digital images that depict multiple different views of a face of the first subject. FIGS. 5 and 8 depict non-limiting examples of how subject reference templates may be selected from a plurality of intake images. Generally, the subject reference templates associated with a particular subject may be selected to provide a variety of different views of the subject's face, such as different facial expressions, different lighting conditions, different poses, etc.

At block 1006, the system may generate, based on the selected subset of intake digital images, first subject reference templates, and store them in subject reference database 412. In some embodiments, the subject reference templates are the same digital images as the selected intake images. In other embodiments, however, the subject reference templates may be altered versions of the corresponding selected intake digital images, e.g., cropped, enhanced, etc. For example, each subject reference template may include a sub-portion of (e.g., cropped from) a corresponding selected intake digital image, e.g., a sub-portion depicting the subject's face. In various embodiments, the generated first subject reference templates may be stored in subject reference database 412 in association with information related to the first subject. More generally, subject reference database 412 may store subject reference templates related to a plurality of subjects, such as all patients who have been registered and/or triaged on a given day, or during a particular time interval.

At block 1008, the system may select a second subject to identify within an area. For example, in the patient monitoring context, the patient having a patient acuity score that places them at the head of the patient queue may be selected, e.g., at block 108 of FIG. 1. Additionally or alternatively, medical personnel may manually select a patient to identify, e.g., using a graphical user interface that depicts information about registered patients such as their acuity measures, pictures, etc. In FIG. 4 and elsewhere herein, the selected subject is often referred to as the "queried subject." In yet other embodiments, rather than attempting to locate a queried patient, the system may simply scan through a sequence of preselected locations, e.g., corresponding to a series of waiting room chairs, and using disclosed techniques, attempt, at each location, to identify whichever subject is in that location (e.g., determine the MRN of the depicted subject).

At block 1010, the system may retrieve second subject reference templates related to the second subject from subject reference database 412. For example, an MRN associated with the subject selected at block 1008 may be provided as input to subject reference database 412. The previously-collected subject reference templates associated with that MRN may be provided as output.

At block 1012, one or more digital images that depict the area (e.g., waiting room 104) may be acquired, e.g., by cameras 276, 346, 476, or other cameras. In the patient monitoring context, the camera(s) that acquire the digital images at block 1012 may or may not be vital sign acquisition cameras. In other contexts, the camera(s) that acquire the digital images at block 1012 may be other types of cameras, and may or may not have PTZ capabilities. As noted above, in various embodiments, there may be any number of cameras that acquire the digital images capturing the area. In some embodiments, the cameras may be constantly and/or continuously capturing digital images of the area, and only those digital images that are captured, e.g., after the subject is selected at block 1008, may be used for operations below.

At block 1014, the system may detect (or localize), as one or more detected face images, one or more portions of the one or more digital images acquired at block 1012 that depict faces of one or more subjects in the area. Various techniques may be used to perform face detection, including but not limited to deep learning, genetic algorithms and/or the eigenface technique. For example, possible human eye regions may be detected by testing all the valley regions in a gray-level digital image. Then, a genetic algorithm may be employed to generate all the possible face regions which include, for instance, the eyebrows, the iris, the nostril and/or the mouth corners. Additionally or alternatively, various other techniques may be employed, such as template matching, scale-invariant feature transform ("SIFT"), linear discriminant analysis, elastic bunch graph matching, hidden Markov models, etc. As noted above, in some embodiments, a number of predetermined locations within the area being monitored (e.g., waiting room 104) may be established/selected as locations likely to contain subjects. In the hospital waiting room context or the airport gate context, the predetermined locations may correspond to seats in the area. In various embodiments, one or more cameras (e.g., 276, 376, 476) may perform PTZ operations to sequentially scan each location, e.g., performing one or more of the above-described operations, to detect depicted faces.

At block 1016, a given detected face image of the detected one or more detected face images may be compared to the second subject reference templates. For example, a detected face image from a first location of a plurality of predetermined locations may be selected. Additionally or alternatively, a last-known location of the currently queried subject may be selected first. Examples of the types of comparison that may be performed include the "first past" machine learning model approach described above in relation to block 426 of FIG. 4, and/or the "second pass" approach described above in relation to block 430, which in some embodiments may constitute pose-adaptive face image matching as demonstrated in FIG. 9.

At block 1018, the system may identify, based on the comparing, the second subject in the one or more digital images that capture the area. For example, if the given detected face image (which as described above may be associated with a location such as a seat in waiting room 104) is determined to depict the queried subject, then the location associated with the given detected face image may be provided as the location of the queried patient. This location may be used for various purposes. For example, one or more vital sign acquisition cameras (which may or may not be the same cameras the captured the digital images waiting room 104) may acquire one or more vital signs from the subject at the location, as described above. Additionally or alternatively, if the subject was queried manually, e.g., by medical or other personnel, then the queried subject's location may be provided as output. In some embodiments, the output location may be provided textually, e.g., "<subject> is sitting in seat 13." In other embodiments, the output location may be used within a graphical user interface (e.g., operated by a duty nurse or other personnel) to annotate a visual rendition of the area being monitored. For example, the queried subject may be visually emphasized, e.g., with a bounding box, or otherwise rendered more conspicuously than other subjects in the area.

Figure 11:
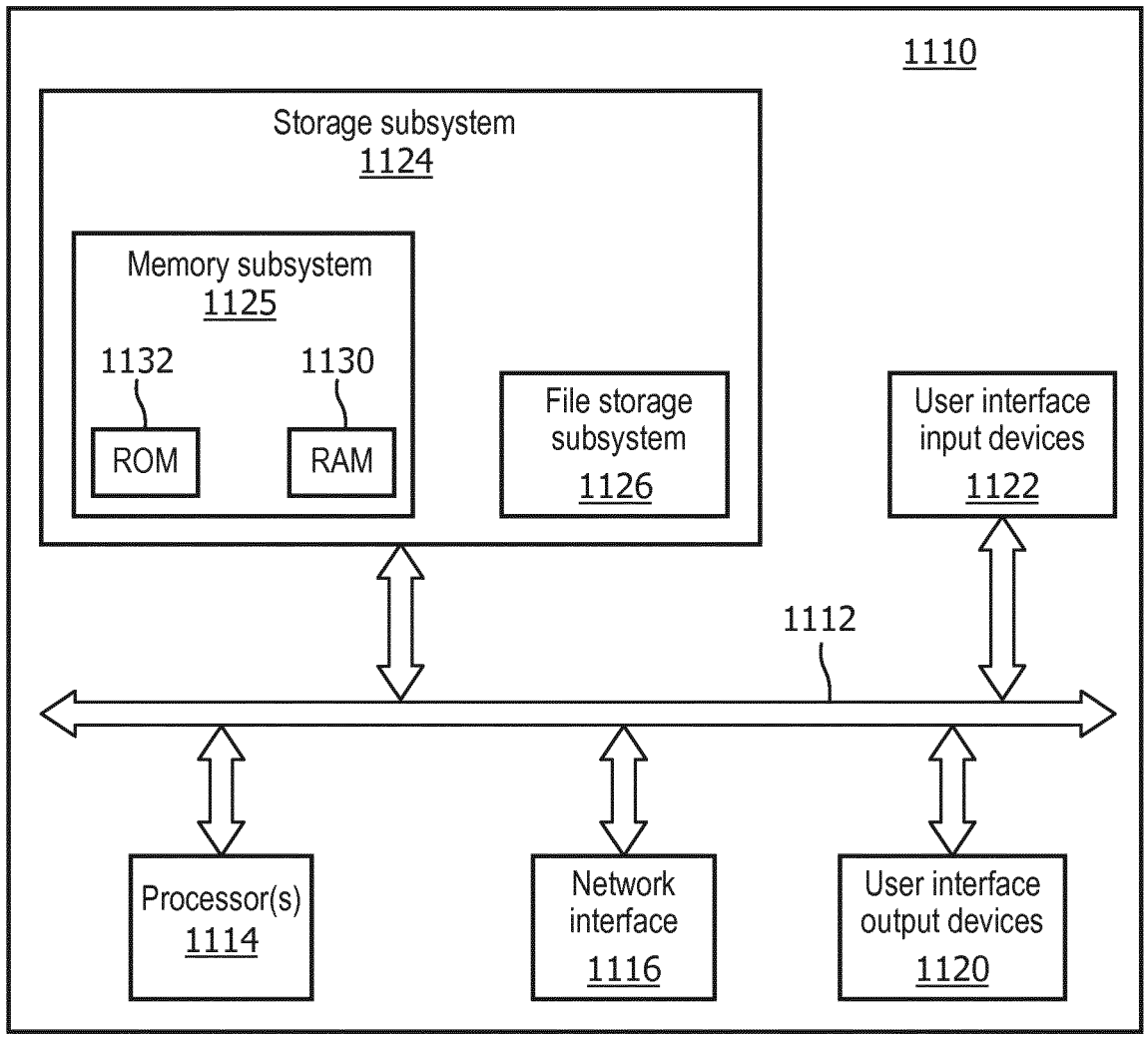
FIG. 11 depicts components of an example computer system.

FIG. 11 is a block diagram of an example computer system 1110. Computer system 1110 typically includes at least one processor 1114 which communicates with a number of peripheral devices via bus subsystem 1112. As used herein, the term "processor" will be understood to encompass various devices capable of performing the various functionalities attributed to components described herein such as, for example, microprocessors, GPUs, FPGAs, ASICs, other similar devices, and combinations thereof. These peripheral devices may include a data retention subsystem 1124, including, for example, a memory subsystem 1125 and a file storage subsystem 1126, user interface output devices 1120, user interface input devices 1122, and a network interface subsystem 1116. The input and output devices allow user interaction with computer system 1110. Network interface subsystem 1116 provides an interface to outside networks and is coupled to corresponding interface devices in other computer systems.

User interface input devices 1122 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 1110 or onto a communication network.

User interface output devices 1120 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1110 to the user or to another machine or computer system.

Data retention system 1124 stores programming and data constructs that provide the functionality of some or all of the modules described herein. For example, the data retention system 1124 may include the logic to perform selected aspects of FIGS. 4-10, and/or to implement one or more components of patient monitoring system 252, including patient identification module 260, patient capture module 254, etc.

These software modules are generally executed by processor 1114 alone or in combination with other processors. Memory 1125 used in the storage subsystem can include a number of memories including a main random access memory (RAM) 1130 for storage of instructions and data during program execution, a read only memory (ROM) 1132 in which fixed instructions are stored, and other types of memories such as instruction/data caches (which may additionally or alternatively be integral with at least one processor 1114). A file storage subsystem 1126 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1126 in the data retention system 1124, or in other machines accessible by the processor(s) 1114. As used herein, the term "non-transitory computer-readable medium" will be understood to encompass both volatile memory (e.g. DRAM and SRAM) and non-volatile memory (e.g. flash memory, magnetic storage, and optical storage) but to exclude transitory signals.

Bus subsystem 1112 provides a mechanism for letting the various components and subsystems of computer system 1110 communicate with each other as intended. Although bus subsystem 1112 is shown schematically as a single bus, alternative implementations of the bus subsystem may use multiple busses. In some embodiments, particularly where computer system 1110 comprises multiple individual computing devices connected via one or more networks, one or more busses could be added and/or replaced with wired or wireless networking connections.

Computer system 1110 can be of varying types including a workstation, server, computing cluster, blade server, server farm, or any other data processing system or computing device. In some embodiments, computer system 1110 may be implemented within a cloud computing environment. Due to the ever-changing nature of computers and networks, the description of computer system 1110 depicted in FIG. 11 is intended only as a specific example for purposes of illustrating some implementations. Many other configurations of computer system 1110 are possible having more or fewer components than the computer system depicted in FIG. 11.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

What is claimed is:

1. A method implemented by one or more processors, the method comprising:

Acquiring with at least one camera a plurality of intake digital images that capture at least a first subject in an area being monitored by the at least one camera;

selecting, from the plurality of intake digital images, a subset of intake digital images that depict multiple different views of a face of the first subject;
generating, based on the selected subset of intake digital images, first subject reference templates, wherein the first subject reference templates are stored in a subject reference database in association with information related to the first subject, the subject reference database capable of storing subject reference templates for a plurality of subjects;
selecting a second subject to identify within the area;
acquiring a plurality of intake digital images of the second subject;
selecting, from the plurality of intake digital images, a subset of intake digital images that depict multiple different views of a face of the second subject;
generating, based on the selected subset of intake digital images of the second subject, second subject reference templates, which are stored in the subject reference database in association with information related to the second subject;
retrieving second subject reference templates from the subject reference database;
acquiring one or more digital images that depict the area;
detecting, as one or more detected face images, one or more portions of the one or more digital images that depict faces of one or more subjects in the area;
comparing a given detected face image of the detected one or more detected face images to the second subject reference templates; and
identifying, based on the comparing, if the second subject is in the one or more digital images that capture the area.

2. The method of claim 1, wherein the area comprises a waiting room, the intake images are acquired using a first camera that is configured to capture a registration or triage area, and the digital images that depict the waiting room are acquired using a second camera that is configured to capture the waiting room.

3. The method of claim 1, wherein the comparing comprises applying the given detected face image as input across a trained machine learning model to generate output that indicates a measure of similarity between the given detected face image and the second subject, wherein the machine learning model is trained based at least in part on the second subject reference templates.

4. The method of claim 3, wherein the trained machine learning model comprises a linear discriminant analysis model.

5. The method of claim 4, further comprising retraining the machine learning model in response to a new subject being added to the subject reference database or an existing subject being removed from the subject reference database.

6. The method of claim 3, wherein the trained machine learning model is trained based on the subject reference templates related to the plurality of subjects.

7. The method of claim 1, wherein one or more of the subset of intake digital images are selected based on being sufficiently dissimilar to one or more other intake digital images.

8. The method of claim 1, further comprising normalizing the one or more face images so that each detected face image depicts a frontal view of a face.

9. The method of claim 8, wherein the normalizing includes geometric warping.

10. A system comprising one or more processors and memory operably coupled with the one or more processors, wherein the memory stores instructions that, in response to execution of the instructions by one or more processors, cause the one or more processors to:
Acquire from at least one camera a plurality of intake digital images that capture at least a first subject in an area being monitored by the at least one camera;
select, from the plurality of intake digital images, a subset of intake digital images that depict multiple different views of a face of the first subject;
generate, from the selected subset of intake digital images, first subject reference templates, wherein the first subject reference templates are stored in a subject reference database in association with information related to the first subject, the subject reference database capable of storing subject reference templates for a plurality of subjects;
select a second subject to identify within the area;
acquire a plurality of intake digital images of the second subject;
select, from the plurality of intake digital images, a subset of intake digital images that depict multiple different views of a face of the second subject;
generate, based on the selected subset of intake digital images of the second subject, second subject reference templates, which are stored in the subject reference database in association with information related to the second subject;
retrieve second subject reference templates related to the second subject from the subject reference database;
acquire one or more digital images that depict the area;
detect, as one or more detected face images, one or more portions of the one or more digital images that depict faces of one or more subjects in the area;
compare a given detected face image of the detected one or more detected face images to the second subject reference templates; and
identify, based on the comparing, if the second subject is in the one or more digital images that capture the area.

11. The system of claim 10, wherein the area comprises a waiting room, the intake images are acquired using a first camera that is configured to capture a registration or triage area, and the digital images that depict the waiting room are acquired using a second camera that is configured to capture the waiting room.

12. The system of claim 10, further comprising instructions to apply the given detected face image as input across a trained machine learning model to generate output that indicates a measure of similarity between the given detected face image and the second subject, wherein the machine learning model is trained based at least in part on the second subject reference templates.

13. The system of claim 12, wherein the trained machine learning model comprises a linear discriminant analysis model.

14. At least one non-transitory computer-readable medium comprising instructions that, in response to execution of the instructions by one or more processors, cause the one or more processors to perform the following operations:
acquiring with at least one camera a plurality of intake digital images that capture at least a first subject in an area being monitored by the at least one camera;
selecting, from the plurality of intake digital images, a subset of intake digital images that depict multiple different views of a face of the first subject;
generating, based on the selected subset of intake digital images, first subject reference templates, wherein the first subject reference templates are stored in a subject reference database in association with information related to the first subject, the subject reference database capable of storing subject reference templates for a plurality of subjects;

selecting a second subject to identify within the area;

acquiring a plurality of intake digital images of the second subject;

selecting, from the plurality of intake digital images, a subset of intake digital images that depict multiple different views of a face of the second subject;

generating, based on the selected subset of intake digital images of the second subject, second subject reference templates, which are stored in the subject reference database in association with information related to the second subject;

retrieving second subject reference templates from the subject reference database;

acquiring one or more digital images that depict the area;

detecting, as one or more detected face images, one or more portions of the one or more digital images that depict faces of one or more subjects in the area;

comparing a given detected face image of the detected one or more detected face images to the second subject reference templates; and identifying, based on the comparing, if the second subject is in the one or more digital images that capture the area.

15. The at least one non-transitory computer-readable medium of claim 14, wherein the area comprises a waiting room, the intake images are acquired using a first camera that is configured to capture a registration or triage area, and the digital images that depict the waiting room are acquired using a second camera that is configured to capture the waiting room.

* * * * *